Dec. 21, 1943. D. BROIDO 2,337,082
LIGHT CONTROLLED CALCULATING AND LIKE MACHINE
Filed Jan. 27, 1941 22 Sheets-Sheet 3

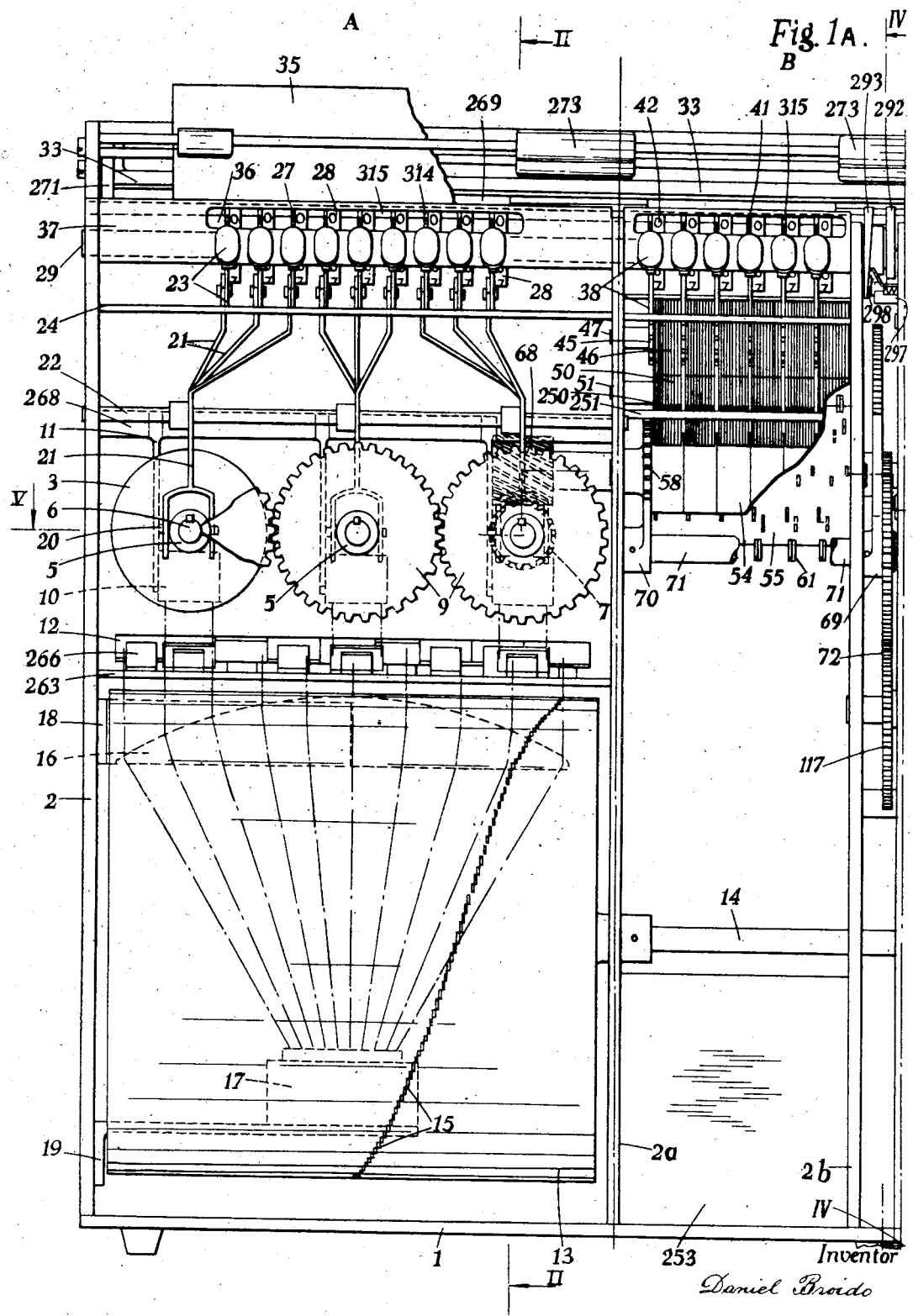

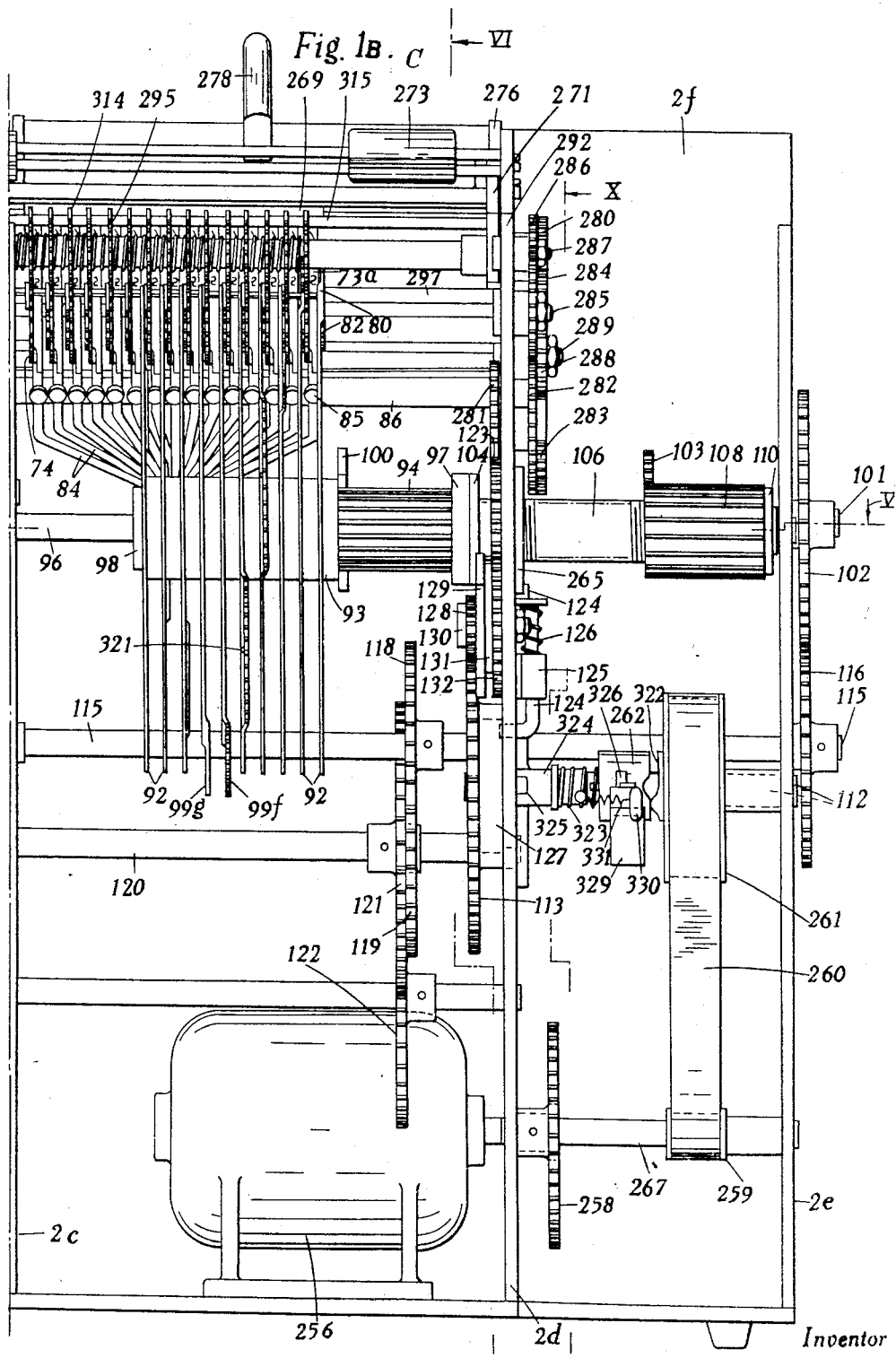

Inventor
Daniel Broido
by
A. Knight Croad
Attorney

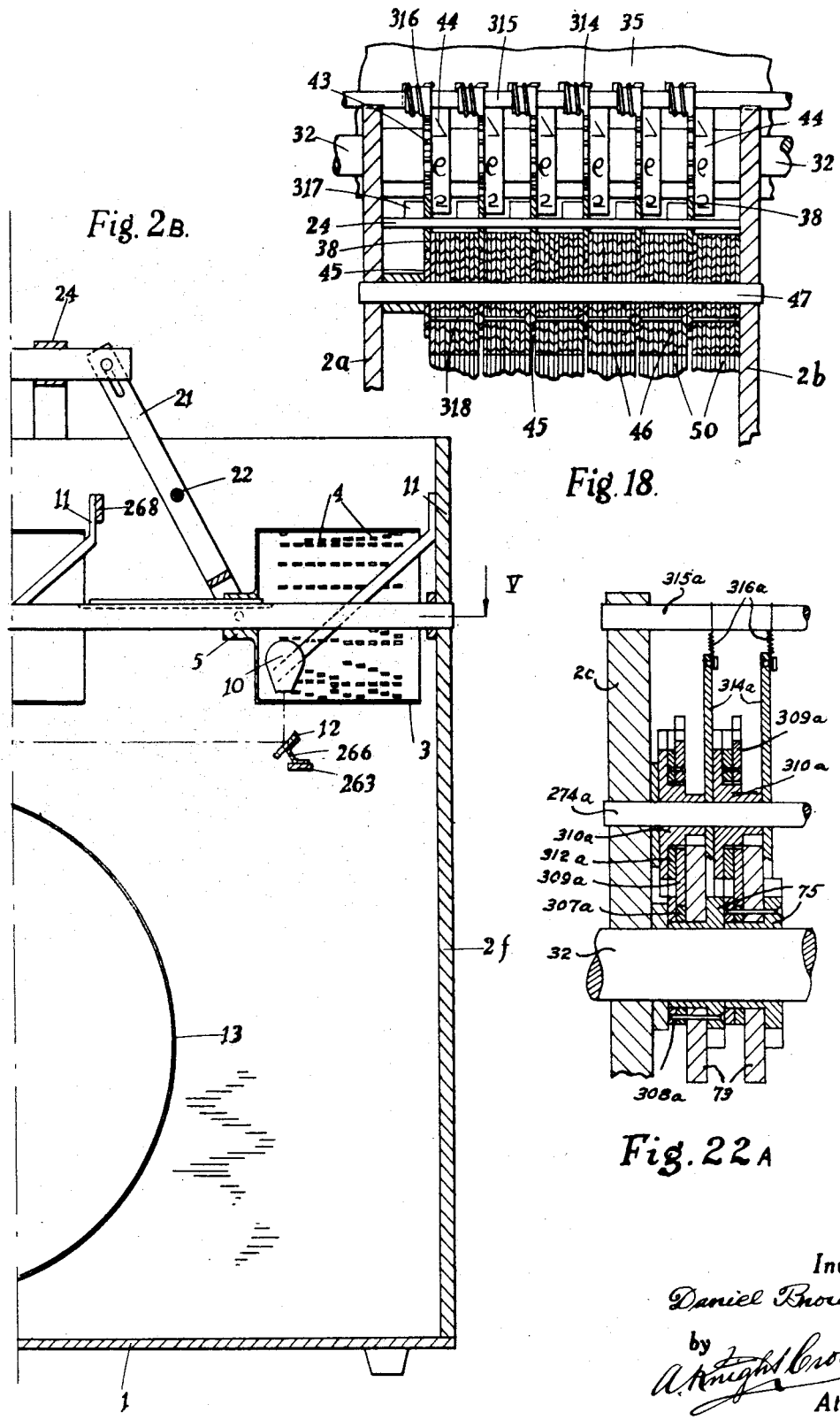

Dec. 21, 1943.    D. BROIDO    2,337,082
LIGHT CONTROLLED CALCULATING AND LIKE MACHINE
Filed Jan. 27, 1941    22 Sheets-Sheet 5
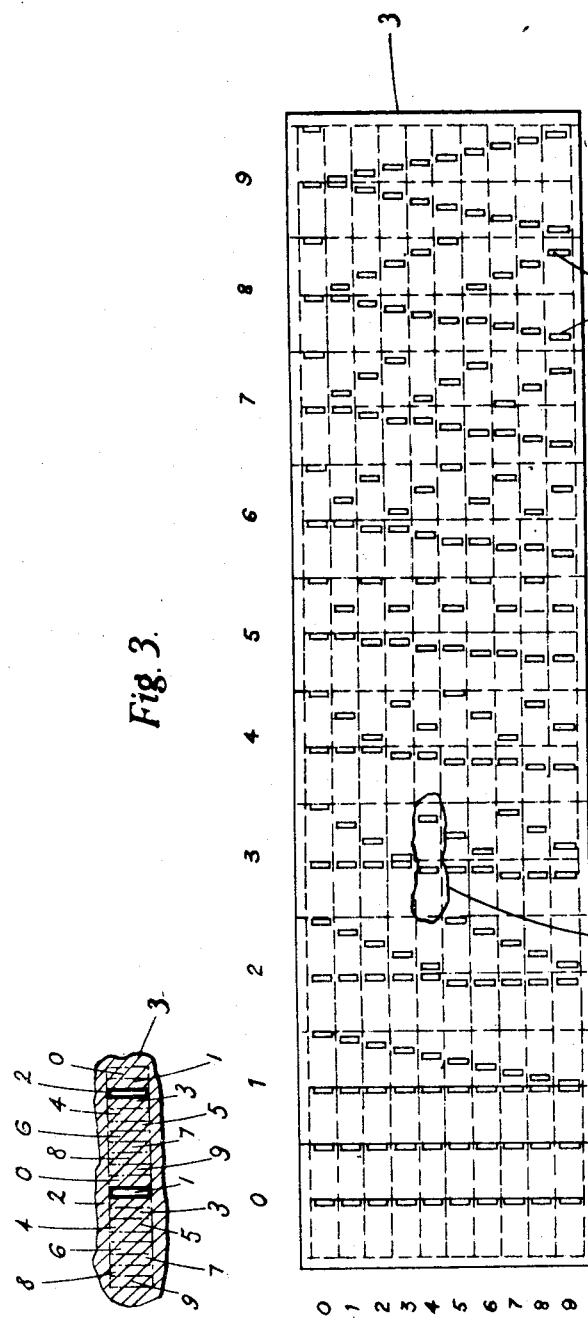
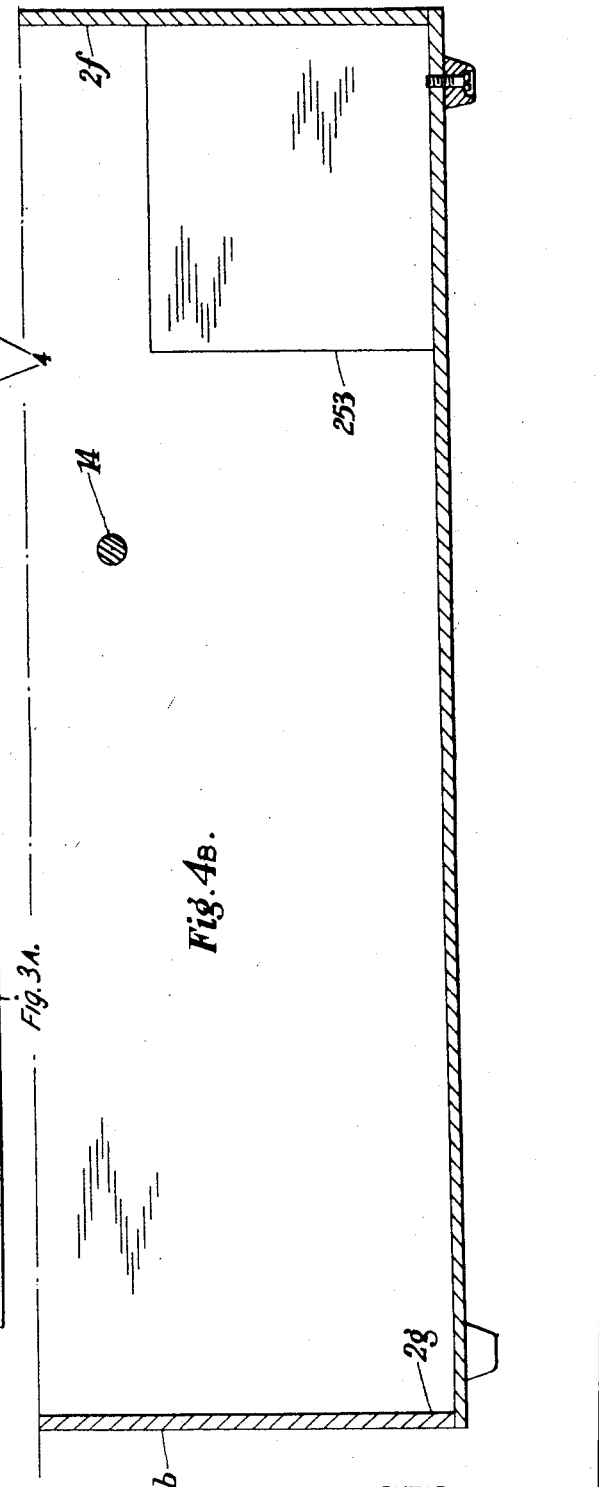
INVENTOR
Daniel Broido
BY
ATTORNEY

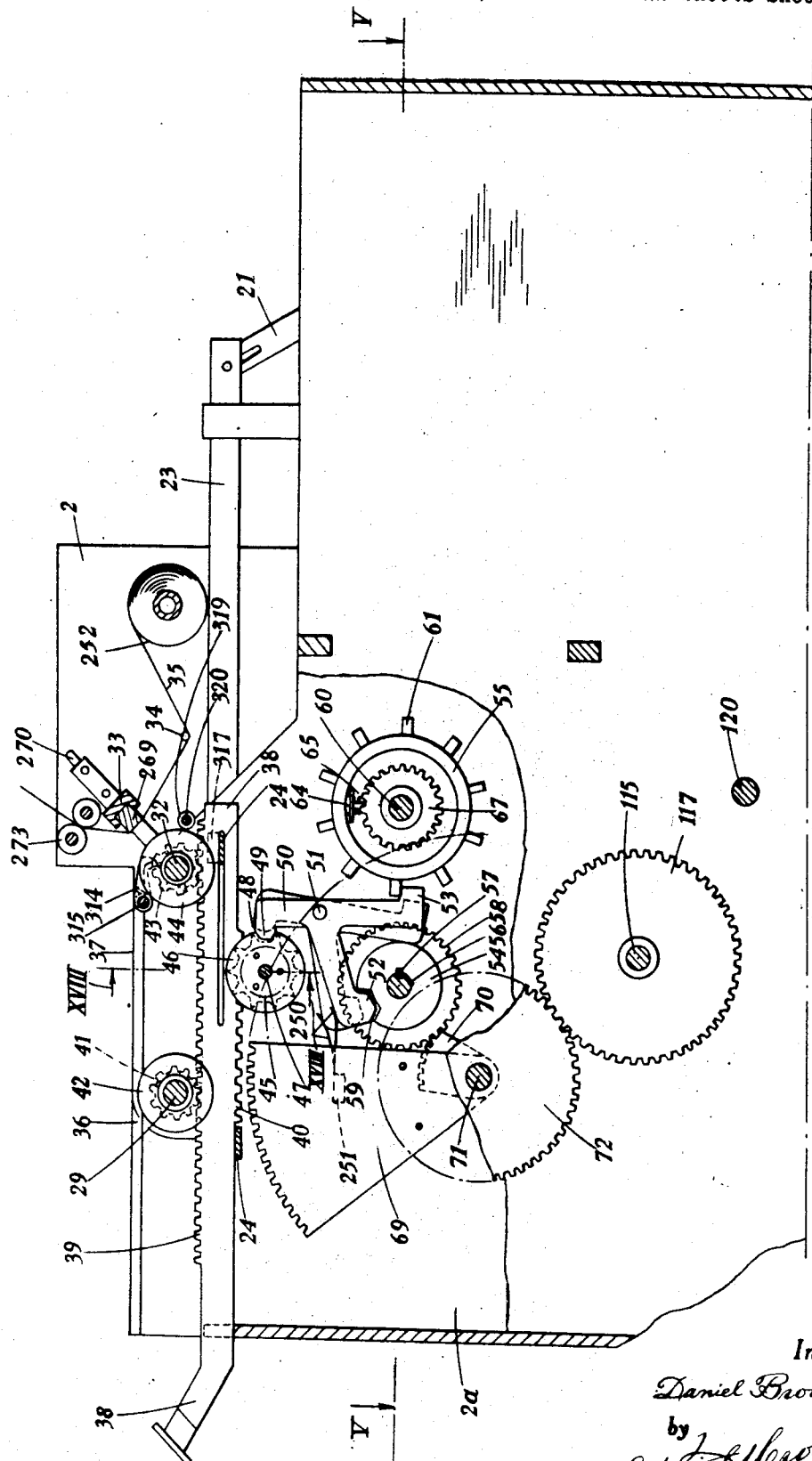

Dec. 21, 1943. D. BROIDO 2,337,082
LIGHT CONTROLLED CALCULATING AND LIKE MACHINE
Filed Jan. 27, 1941 22 Sheets-Sheet 7

Inventor
Daniel Broido
by A. Knight Croad
Attorney

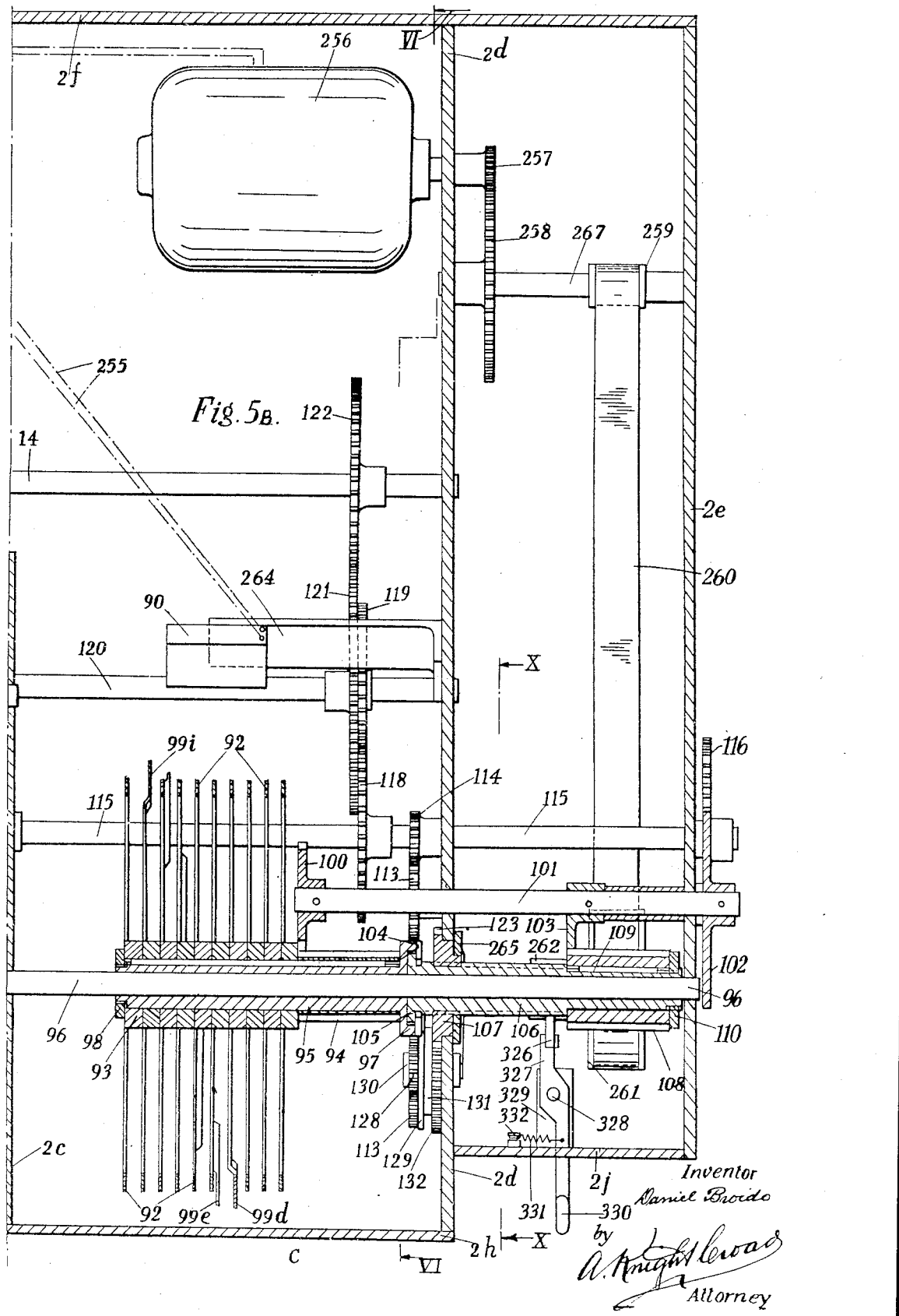

Dec. 21, 1943.    D. BROIDO    2,337,082
LIGHT CONTROLLED CALCULATING AND LIKE MACHINE
Filed Jan. 27, 1941    22 Sheets-Sheet 10

Inventor
Daniel Broido
by
A. Knight Croad
Attorney

Dec. 21, 1943.  D. BROIDO  2,337,082
LIGHT CONTROLLED CALCULATING AND LIKE MACHINE
Filed Jan. 27, 1941  22 Sheets-Sheet 11
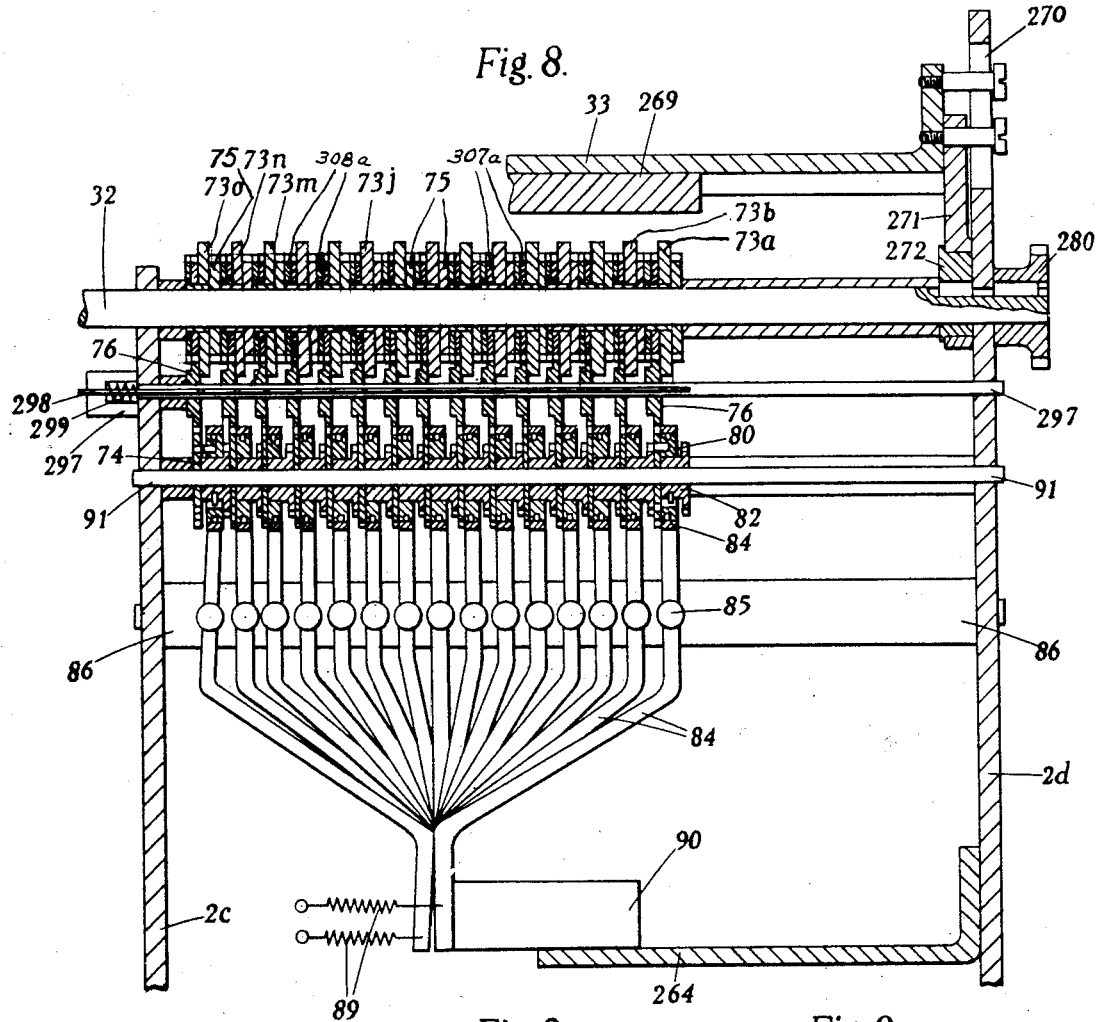
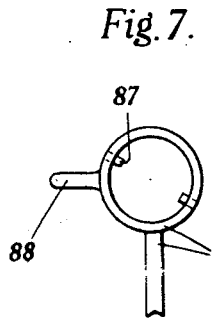
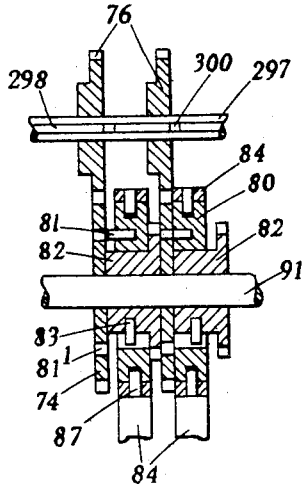
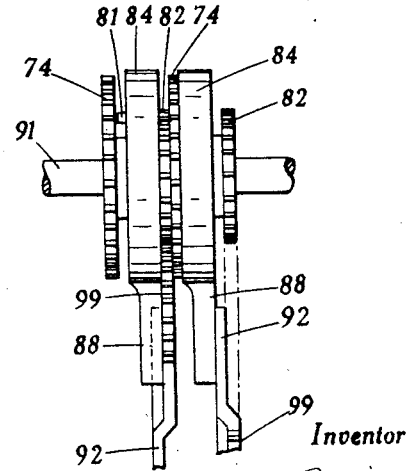
Inventor
Daniel Broido
by
A. Knight Croad
Attorney

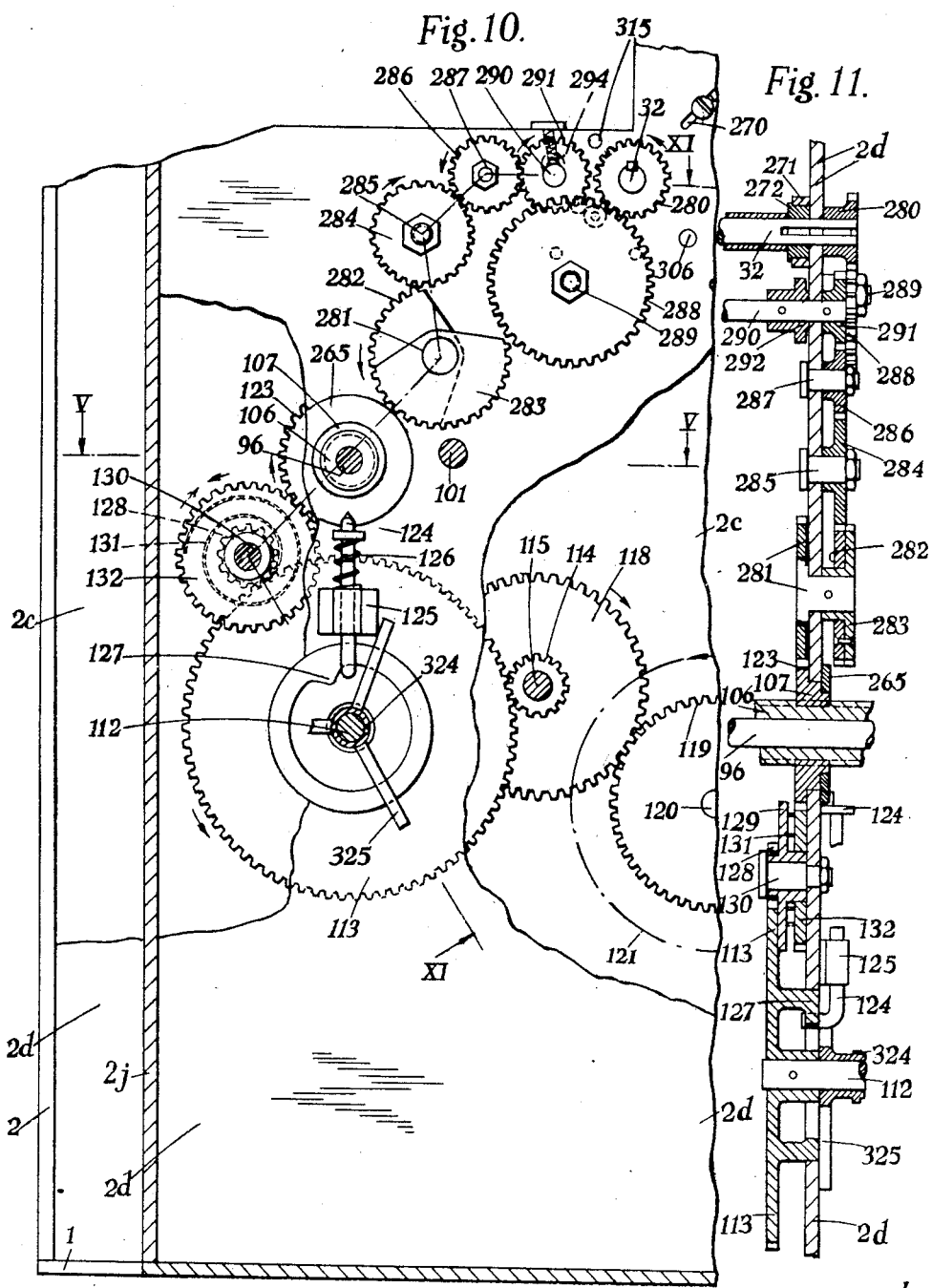

Dec. 21, 1943.  D. BROIDO  2,337,082
LIGHT CONTROLLED CALCULATING AND LIKE MACHINE
Filed Jan. 27, 1941  22 Sheets-Sheet 16
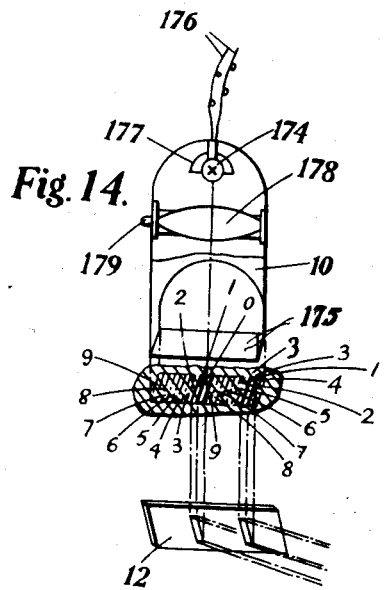
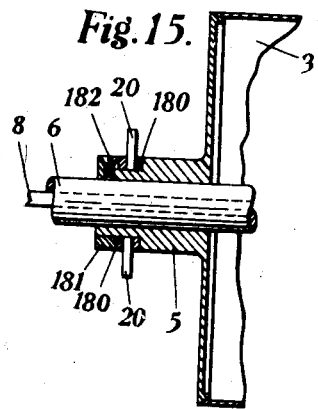
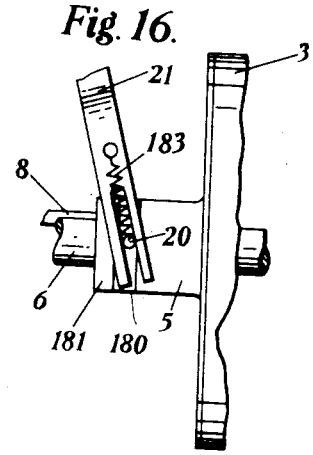
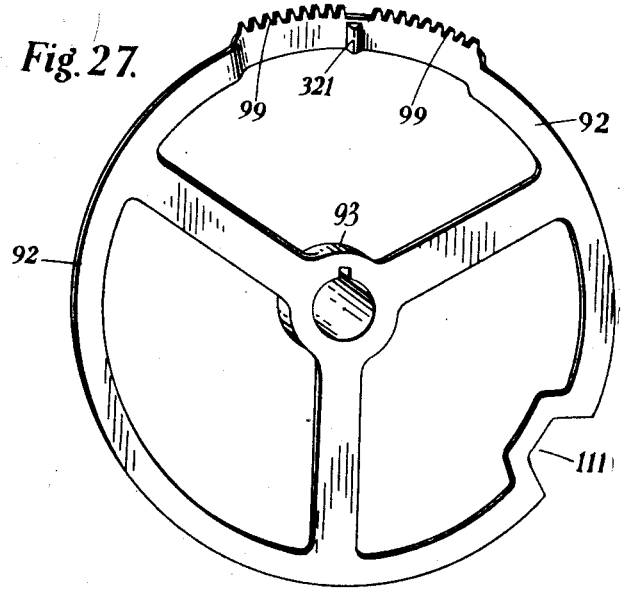
INVENTOR
Daniel Broido
BY
ATTORNEY Dec. 21, 1943.   D. BROIDO   2,337,082
LIGHT CONTROLLED CALCULATING AND LIKE MACHINE
Filed Jan. 27, 1941   22 Sheets-Sheet 18
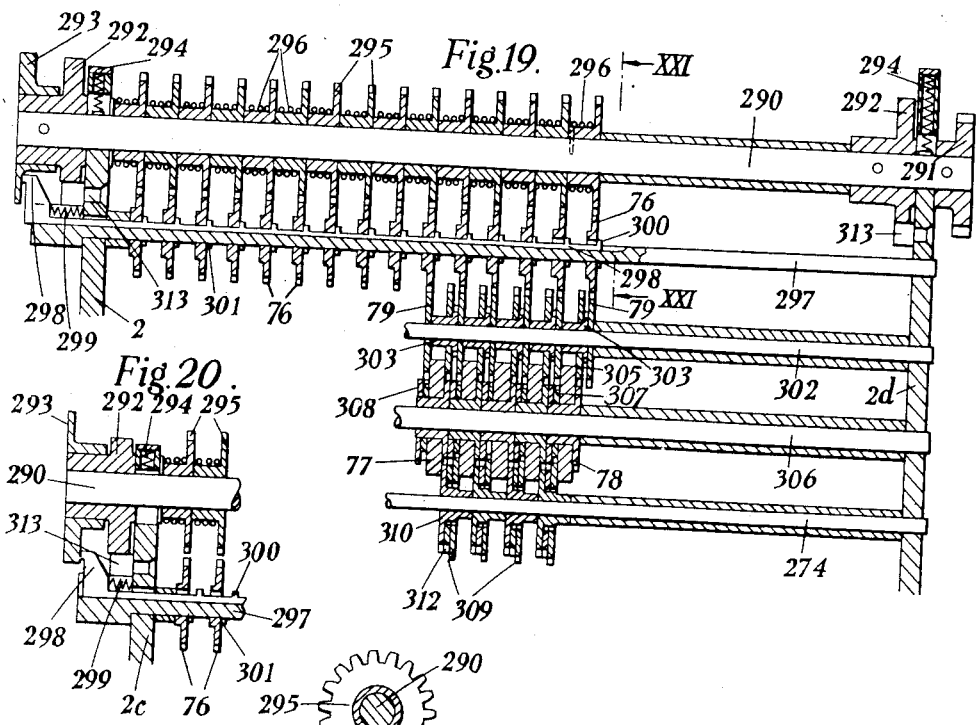
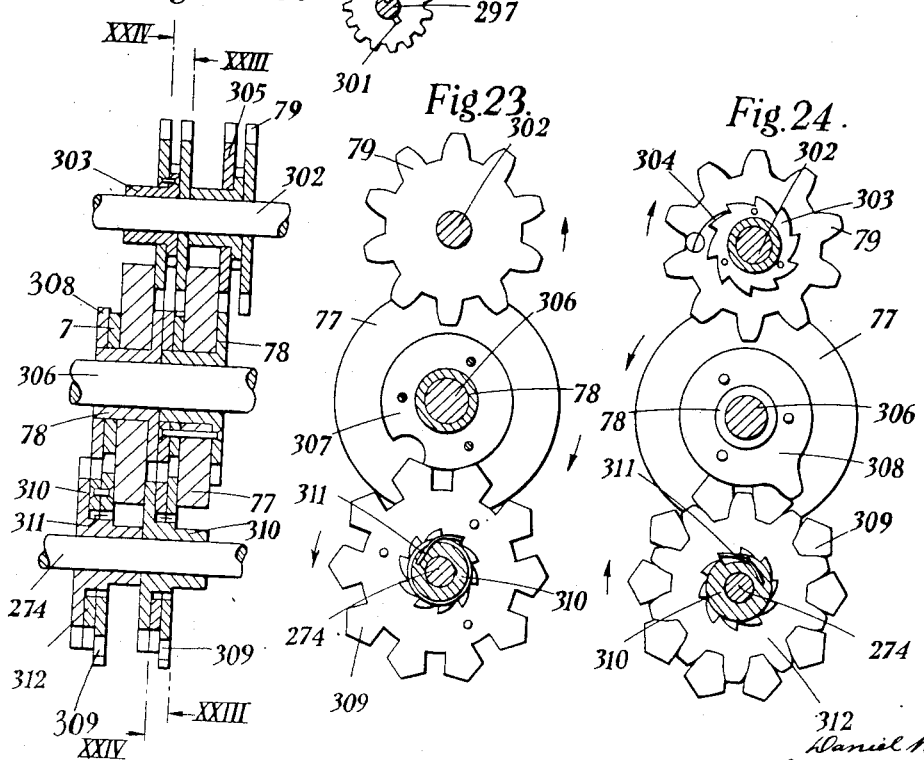
Inventor
Daniel Broido
by
A. Knight Croad
Attorney Dec. 21, 1943.   D. BROIDO   2,337,082
LIGHT CONTROLLED CALCULATING AND LIKE MACHINE
Filed Jan. 27, 1941   22 Sheets-Sheet 19

INVENTOR
Daniel Broido
BY
A. Knight Broad
ATTORNEY

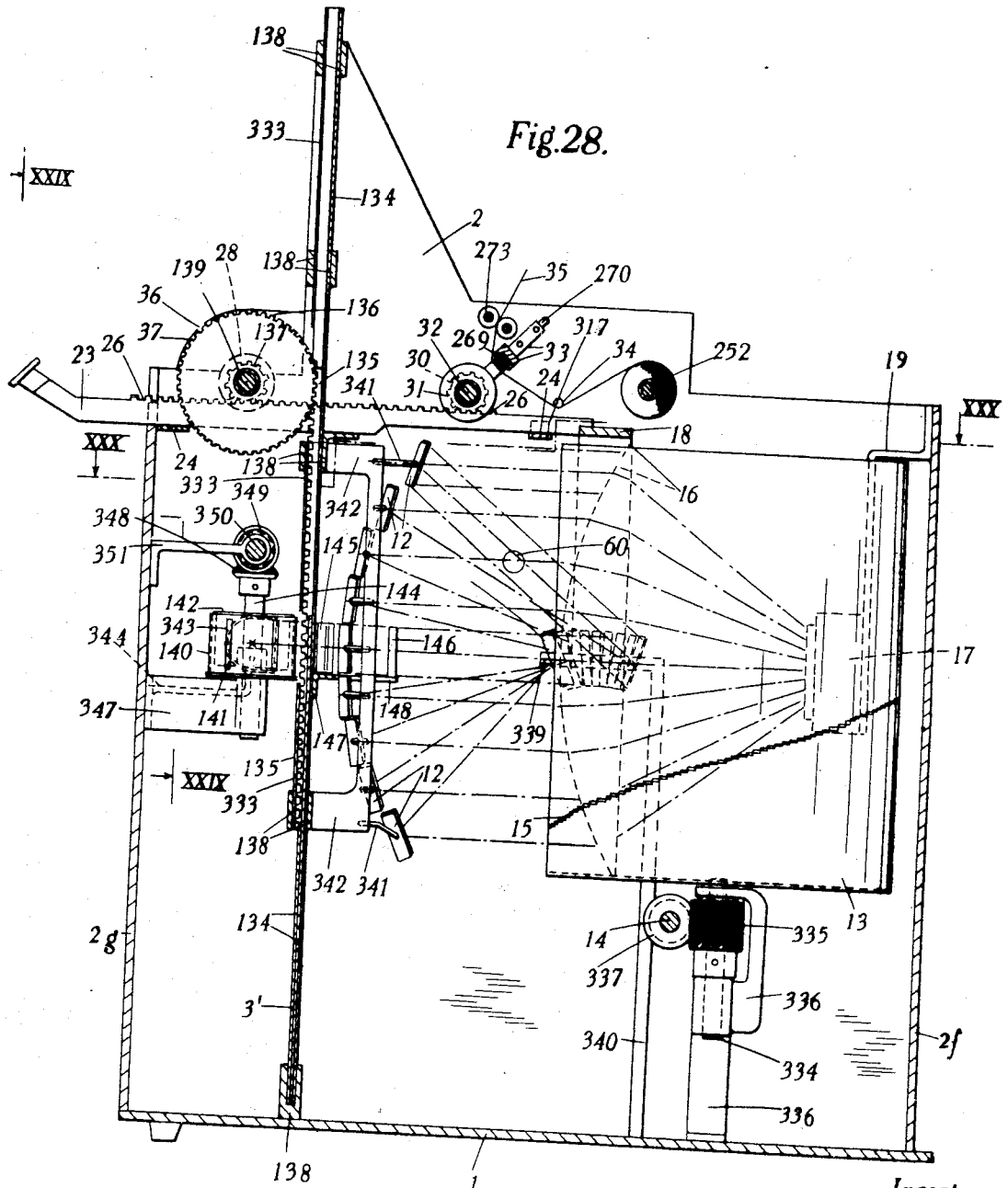

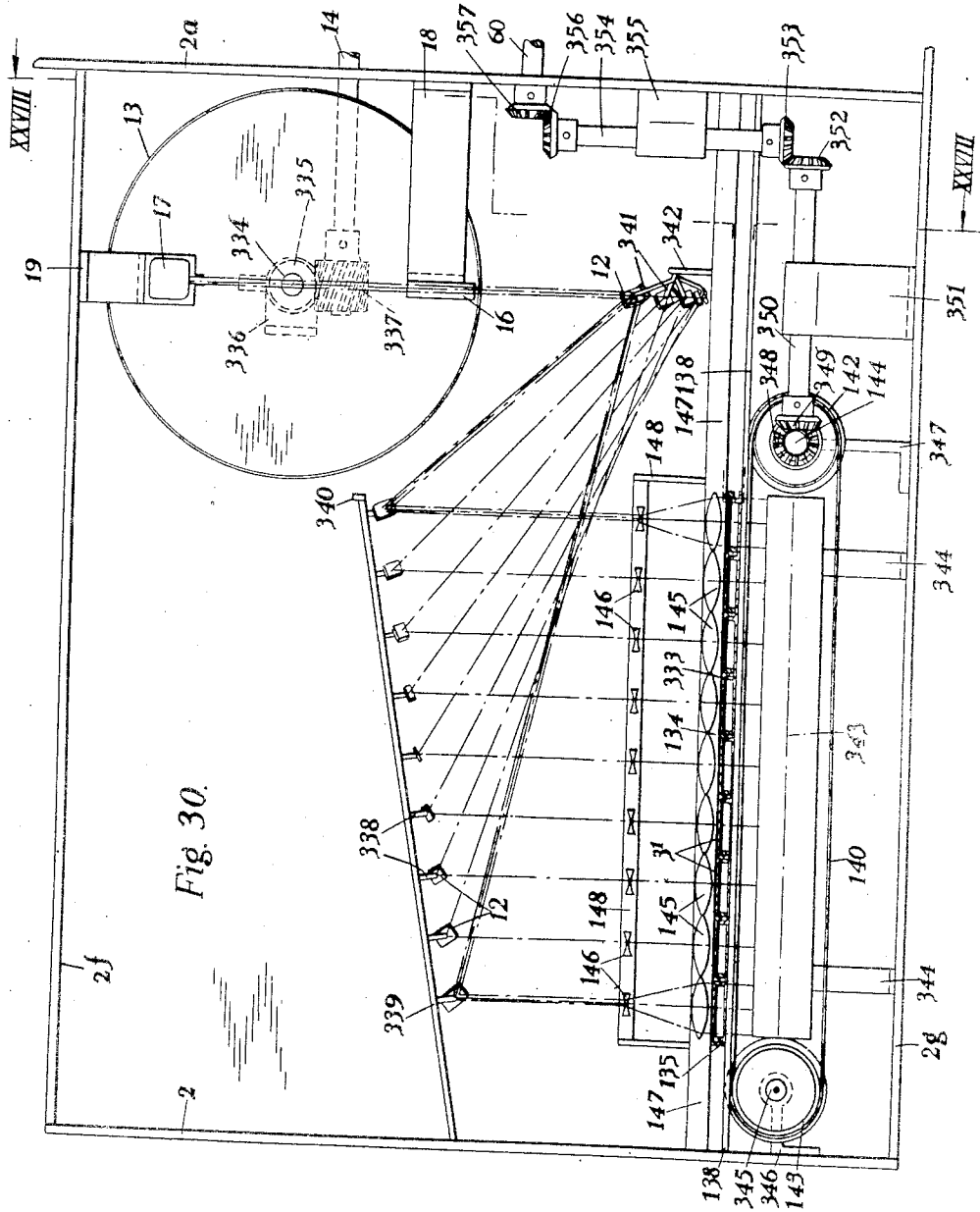

Patented Dec. 21, 1943

2,337,082

UNITED STATES PATENT OFFICE 2,337,082

LIGHT-CONTROLLED CALCULATING AND LIKE MACHINE

Daniel Broido, Cockfosters, Barnet, England

Application January 27, 1941, Serial No. 376,175

14 Claims. (Cl. 235—60)

This invention relates to light controlled calculating and like machine.

It has previously been proposed to construct a light controlled calculating machine, but this prior proposal is mainly of an experimental character and is not suitable for practical office work.

The primary object of the present invention is to provide a light controlled calculating machine of simple and reliable construction and of operation capable of replacing existing calculating machines which are operated either mechanically or by electrical contact members.

Another object of the invention is to provide a light controlled machine in which the factors can be readily set up and the calculation performed in a minimum time.

A further object of the invention is to provide a calculating machine employing tables which are not subject to deterioration by wear due to mechanical or electrical contact.

A further object of the invention is to provide a light controlled machine adapted to print automatically both factors involved in a calculation and also the result of combining these two factors. The present application is a continuation in part of an application Ser. No. 187,518 filed January 28, 1938. The invention is illustrated in the accompanying drawings wherein:

Figure 1, composed of Figures 1A and 1B, shows, in front elevation, a machine based on the present invention, the machine cover being removed;

Figure 2, composed of Figures 2A and 2B, is a vertical section on line II—II of Figures 1 and 5;

Figure 3 shows a multiplication screen used in the machine;

Figure 3A is an enlarged portion of Figure 3;

Figure 5A:
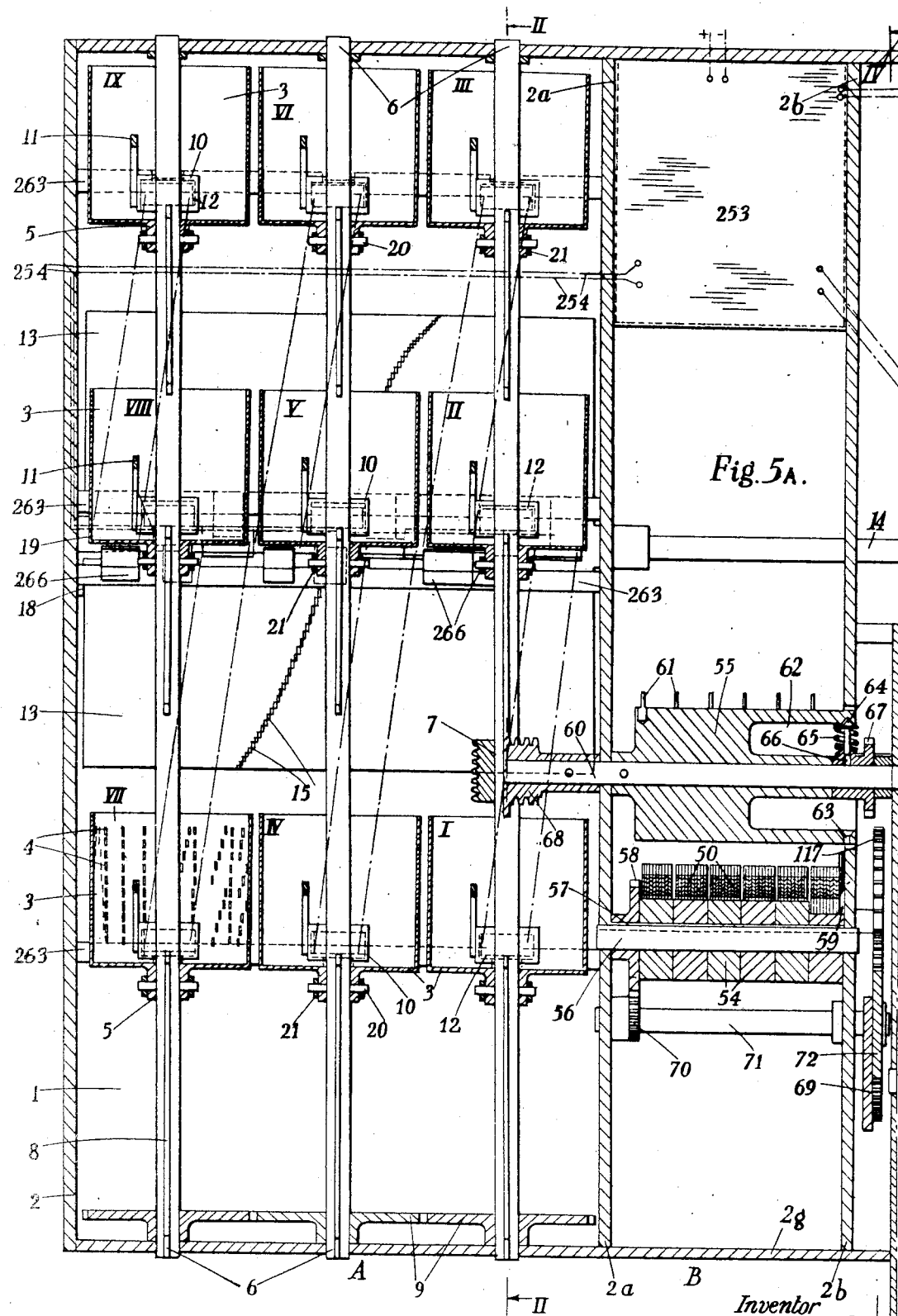
Figure 6A:
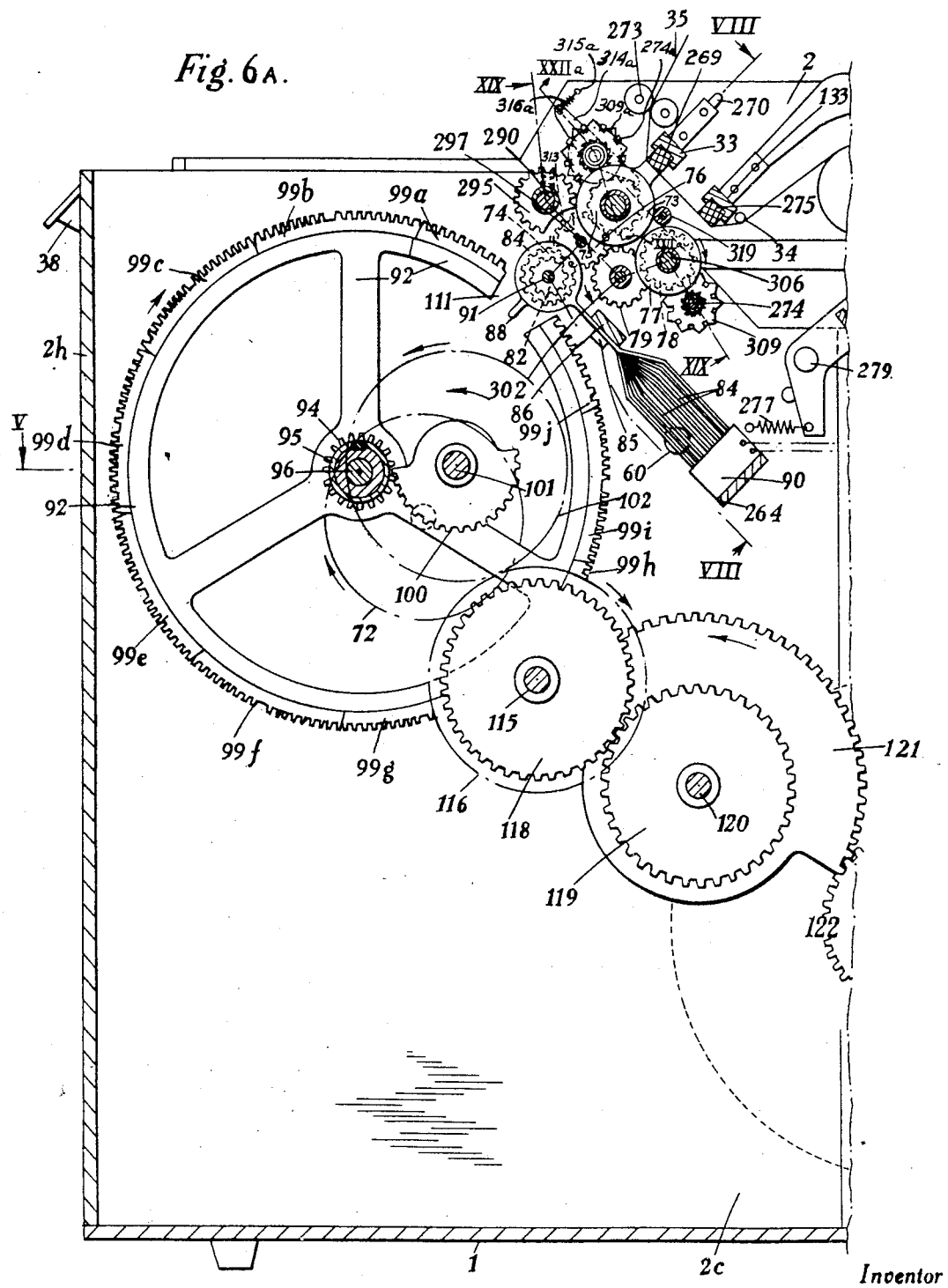
Figure 6B:
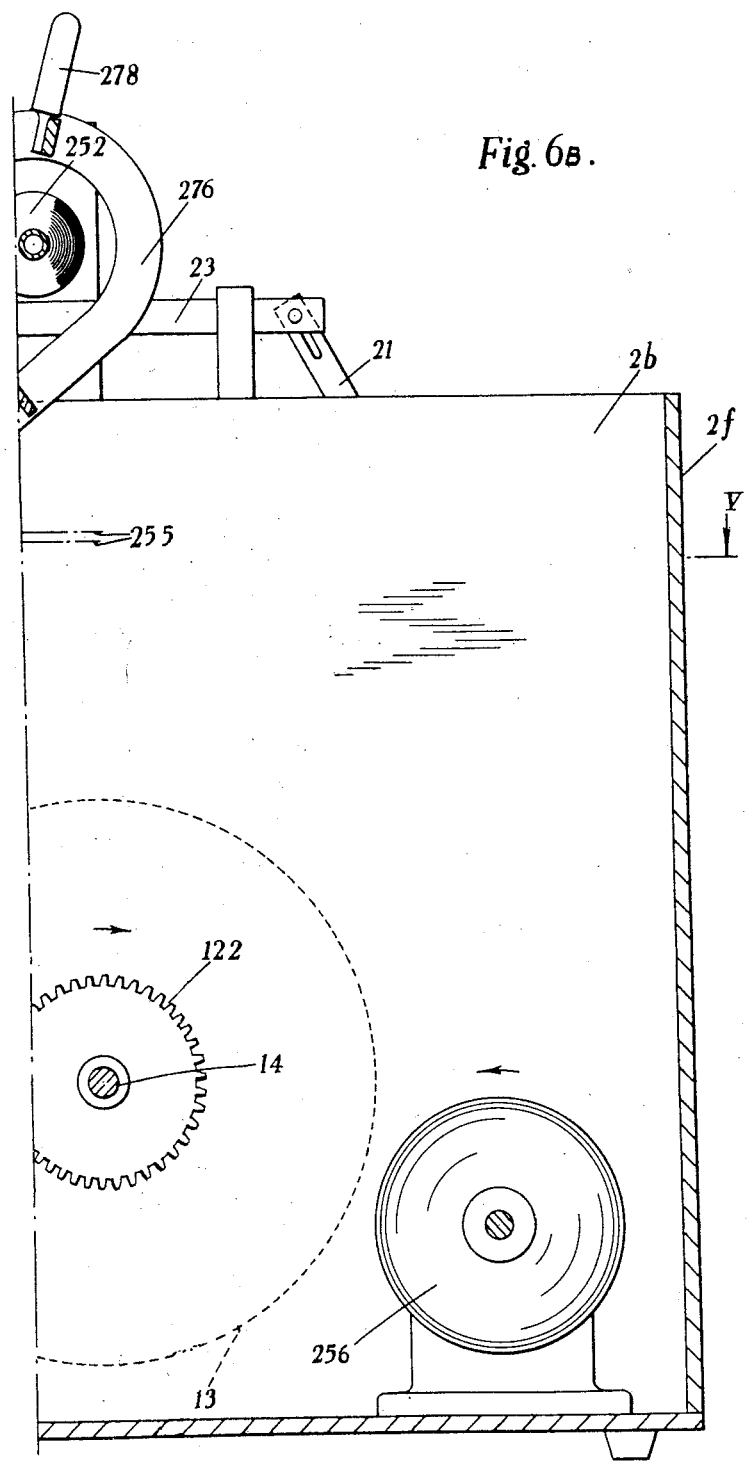
Figure 12:
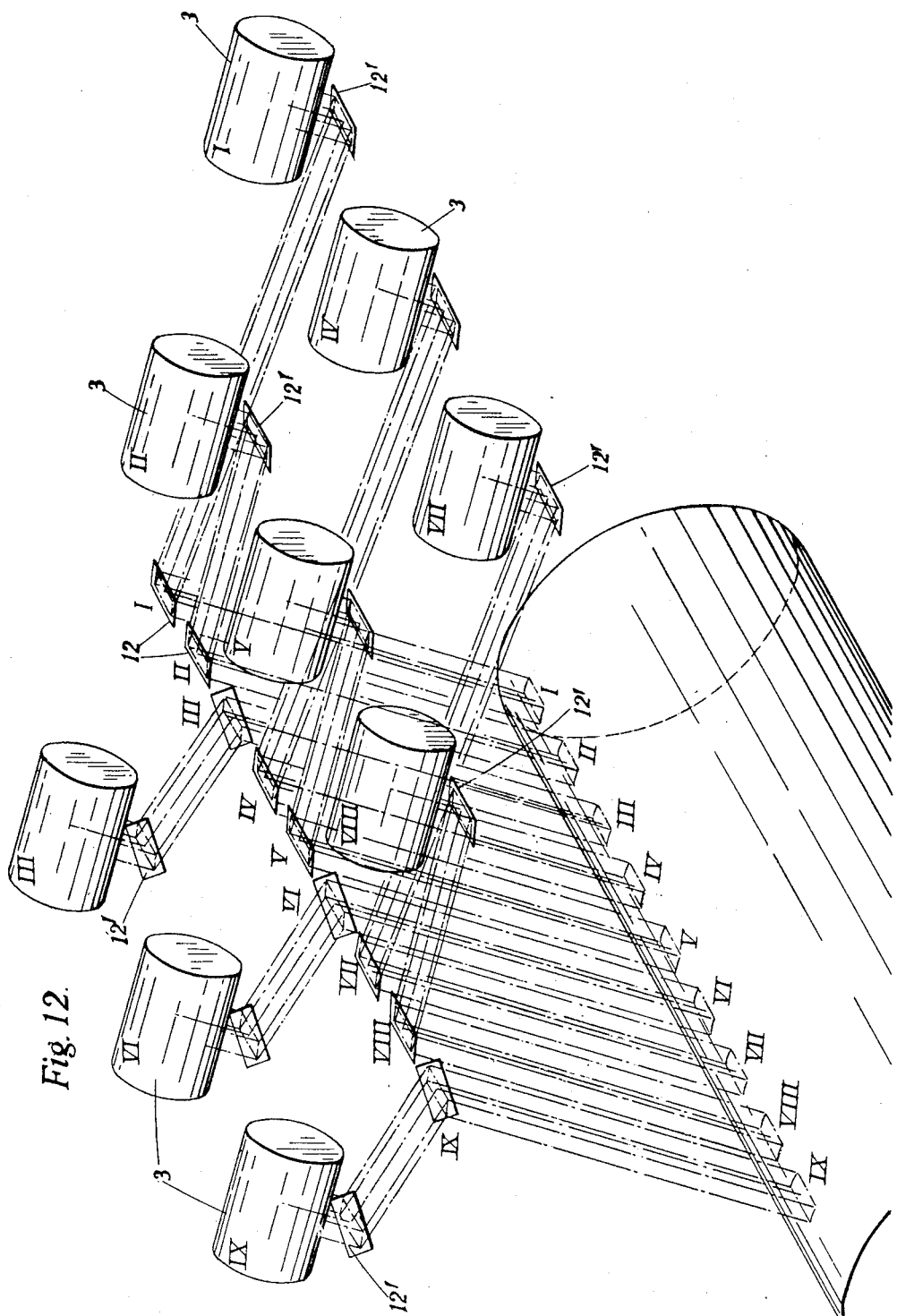
Figure 13A:
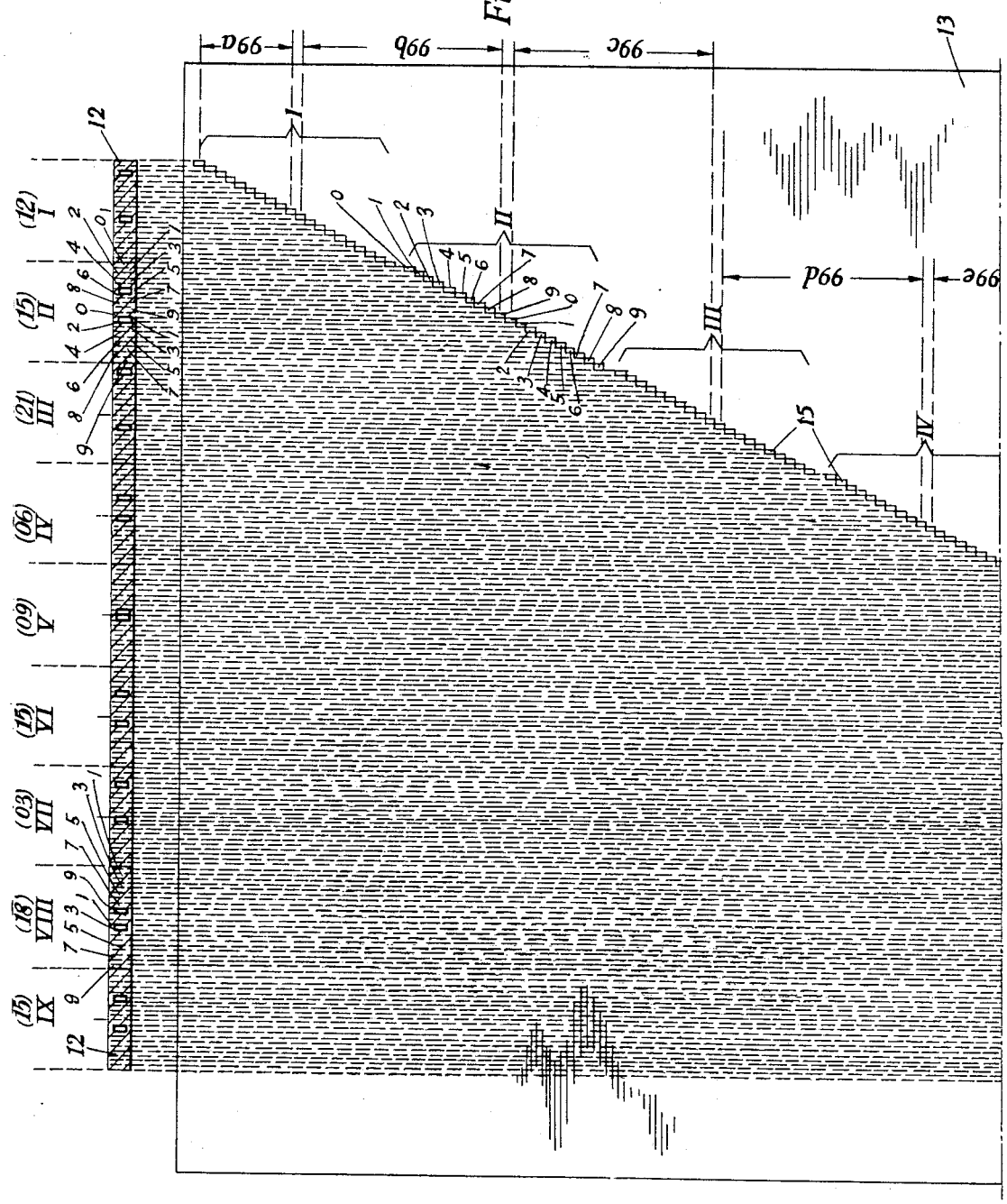
Figure 13B:
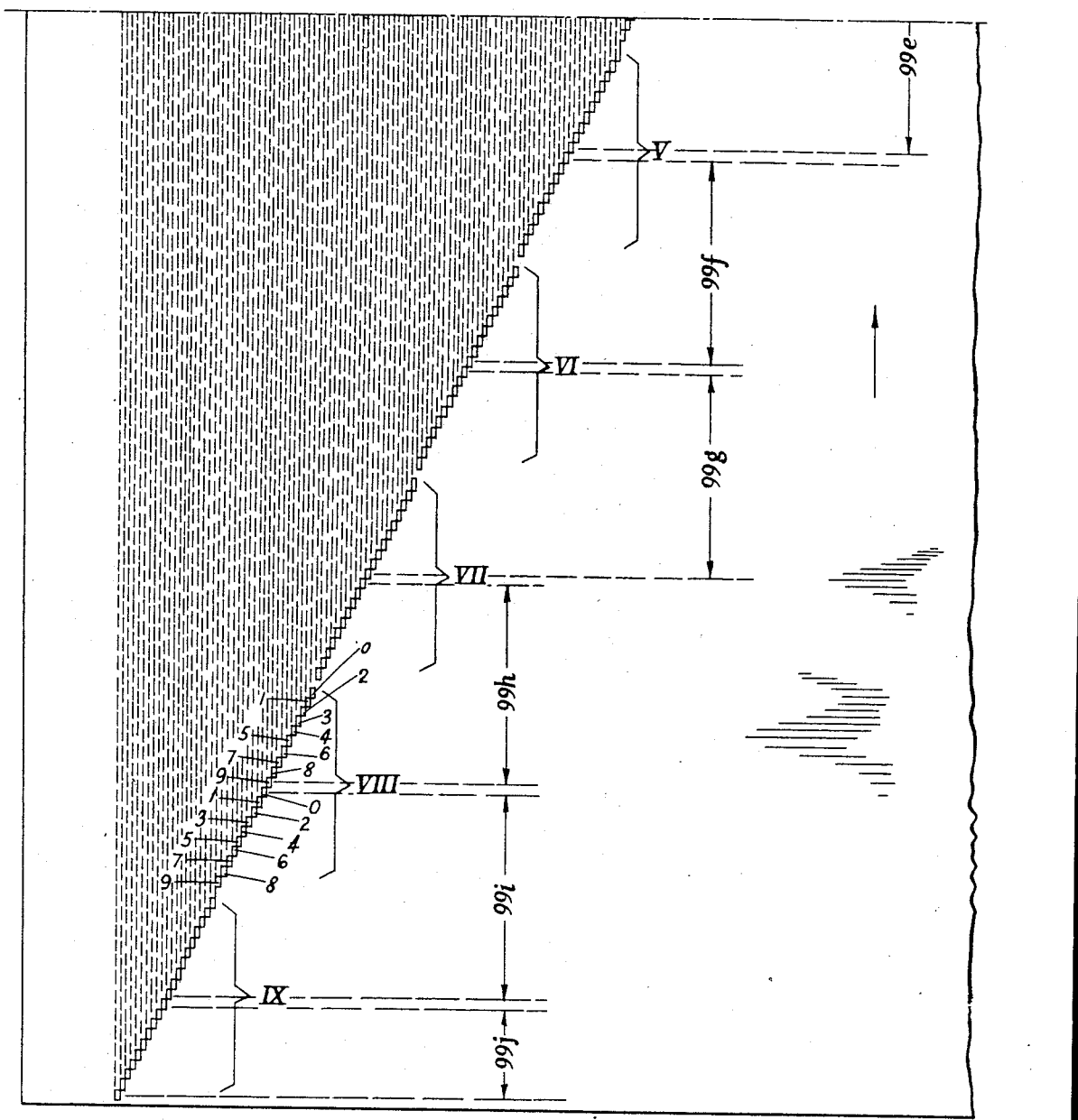
Figure 17A:
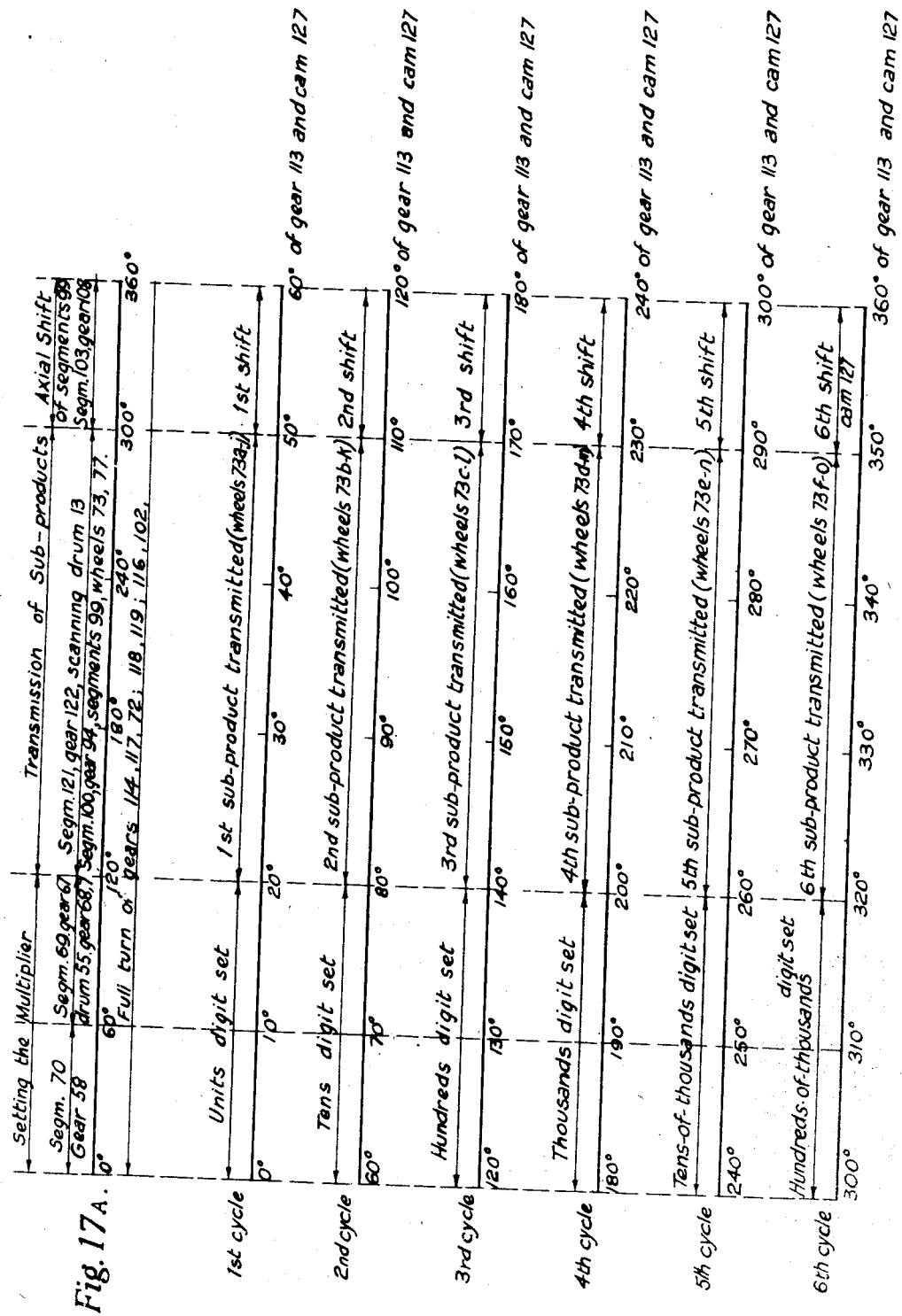
Figures 25, 26:
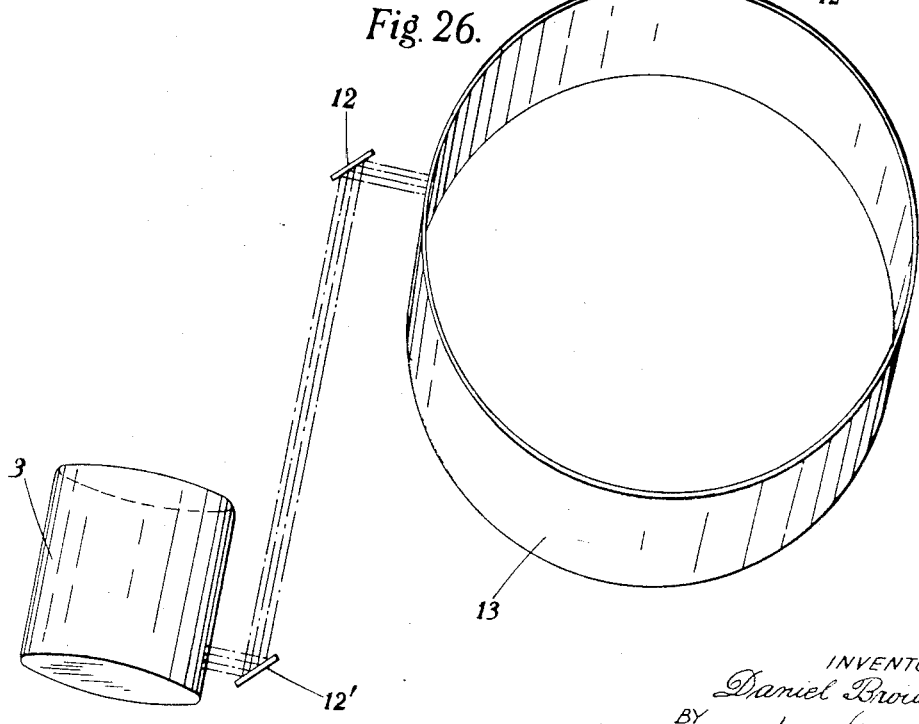
Figure 29:
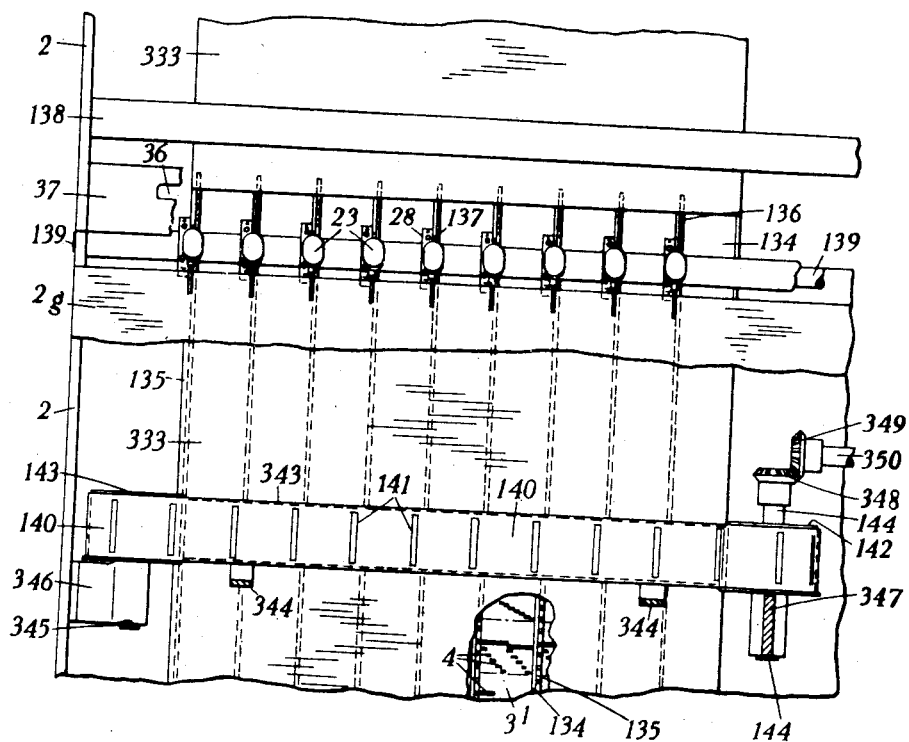

Figure 4, composed of Figures 4A and 4B, is a vertical section on line IV—IV of Figures 1 and 5;

Figure 5, composed of Figures 5A and 5B, is a horizontal section of the machine taken on line V—V of Figures 1, 2, 4, 6 and 10;

Figure 6, composed of Figures 6A and 6B, is a vertical section on line VI—VI of Figures 1 and 5;

Figure 7 is a detail view of a clutch fork used in the machine;

Figure 8 is a section (in development) on line VIII—VIII of Figure 6;

Figure 9 is a section through, and Figure 9A is a view of, clutches and other details;

Figure 10 is a partial sectional view taken on line X—X of Figures 1 and 5;

Figure 11 is a section (in development) on line XI—XI of Figure 10;

Figure 12 is a diagrammatic view showing the general arrangement of multiplication screens, reflectors and scanning drum;

Figure 13, composed of Figures 13A and 13B, is a development of the scanning drum, showing diagrammatically the associated reflectors;

Figure 14 shows, partly in elevation and partly in section, a lamp used in the machine, a portion of the asociated multiplication screen, and, diagrammatically, the associated reflector;

Figure 15 shows in section, and Figure 16 in side elevation, means for mounting the multiplication screens;

Figures 17A and 17B together constitute a timing chart illustrating the operation of the machine;

Figure 18 is a section on line XVIII—XVIII of Figure 4;

Figure 19 is a section on line XIX—XIX of Figure 6;

Figure 20 is a portion of Figure 19, the parts being shown in positions different to those of Figure 19;

Figure 21 is a section on line XXI—XXI of Figure 19;

Figure 22 is a section through the totalizer;

Figure 22A is a section on line 22A of Figure 6A showing the carry device of the register;

Figure 23 is a section on line XXIII—XXIII, and,

Figure 24 is a section on line XXIV—XXIV of Figure 22;

Figure 25 is a diagrammatic detail view illustrating how the reflectors are associated with the multiplication screens and the scanning drum;

Figure 26 is a view, in the direction of the arrow, of Figure 25;

Figure 27 shows an arcuate rack for the register;

Figure 28 is a vertical section on line XXVIII—XXVIII of Figure 30 showing another embodiment of the invention;

Figure 29 is partly a front elevation, and partly a section on line XXIX—XXIX of Figure 28, and, Figure 30 is a horizontal section on line XXX—XXX of Figure 28.

The particular machine illustrated in the drawings is adapted to the decimal system of numbers and is capable of multiplying a multiplicand having a maximum of nine digits by a multiplier having a maximum of six digits.

General arrangement

Broadly stated, the machine based on this invention is of the direct multiplying type employing products-set devices representing multiplication tables and comprising screens marked with partial products (1 to 9) multiplied by (1 to 9).

The multiplicand and multiplier are set up on the keyboards; this results in the multiplication screens being set according to the multiplicand, whereupon they are automatically set according to the lowest denomination of the multiplier, and the relevant areas on the screens are exposed to beams of light energy which project the representations of partial products, by means of mirrors, onto a scanning cylinder, coacting with a light sensitive device. To effect the scanning, the scanning cylinder is turned in synchronism with mechanically driven numeral wheels of a register controlled by said sensitive device, each numeral wheel being stopped whenever the light-sensitive device is actuated by light energy illuminating a value of the respective partial product, and in this manner the first sub-product is transferred to the register. The multiplication screens are re-set for the second digit of the multiplier, and the procedure is repeated until all sub-products are accumulated in the register and the final product thus formed.

The machine is mounted upon a base 1 within vertical frame members 2—2f and may be regarded as consisting of a multiplicand selecting part A, a multiplier selecting part B, and the result transmitting part C (Figure 1).

The main parts of the machine will now be described under their specific headings.

Multiplication screens

In the machine shown in the drawings nine multiplication screens 3 are employed, one for each digit of the multiplicand. Figure 3 illustrates one of the screens 3 in development, and Figure 3A illustrates in detail the arrangement of the slots 4. As shown in Figure 3, the area of the screen 3 is sub-divided into ten vertical columns denoted respectively 0–9 along the horizontal coorinate, and ten horizontal rows likewise denoted respectively 0–9 along the vertical co-ordinate. The columns and rows denoted 1–9 respectively provide 81 product areas, to which must be added the 19 areas allocated to zero, thus providing 100 areas in all. Each product area is divided into two separate areas, namely a tens area and a units area, each of which, as shown in Figure 3A, is again sub-divided by imaginary vertical lines into ten equal sub-divisions denoted respectively 0–9. One sub-division is perforated in each of the separate areas of each product area, the perforations being located so as to represent by their positions either zero or a numeral 1–9. Thus, the perforations in each product area represent two numerals, and the arrangement is such that these two numerals represent the partial product obtained by multiplying the numeral denoting the respective horizontal row with the numeral denoting the respective vertical column. For example, in Figure 3A the perforations are, in the tens sub-division, 1, and in the units sub-division, 2, representing the value 12, which is obtained by multiplying 3 (vertical column in which the product area is located) by 4 (horizontal row in which the area is located).

The multiplication screens 3 are formed as cylinders. As best shown in Figure 5, the nine screens 3 are carried on three shafts 6, each shaft carrying three screens. The screens 3 are provided with hubs 5 slidably mounted on shafts 6 revolubly mounted in frame members 2g, 2f of the machine. As shown in Figures 15 and 16, the hubs 5 are provided with pins 20 carried on rings 180 rotatably mounted on reduced ends of the hubs 5 and secured thereon by end collars 181 fixed by screws 182 to the hubs 5.

Multiplicand setting mechanism

As already mentioned, the product areas on the screens 3 are arranged along two co-ordinates so that the screens can be moved along one co-ordinate (in the present case along the axis) according to the numerals of the multiplicand, and along the other co-ordinate (in the present case around the axis) according to the numerals of the multiplier. The mechanism for setting the screens according to the numerals of the multiplicand is shown in Figures 2 and 5.

Figure 2A:
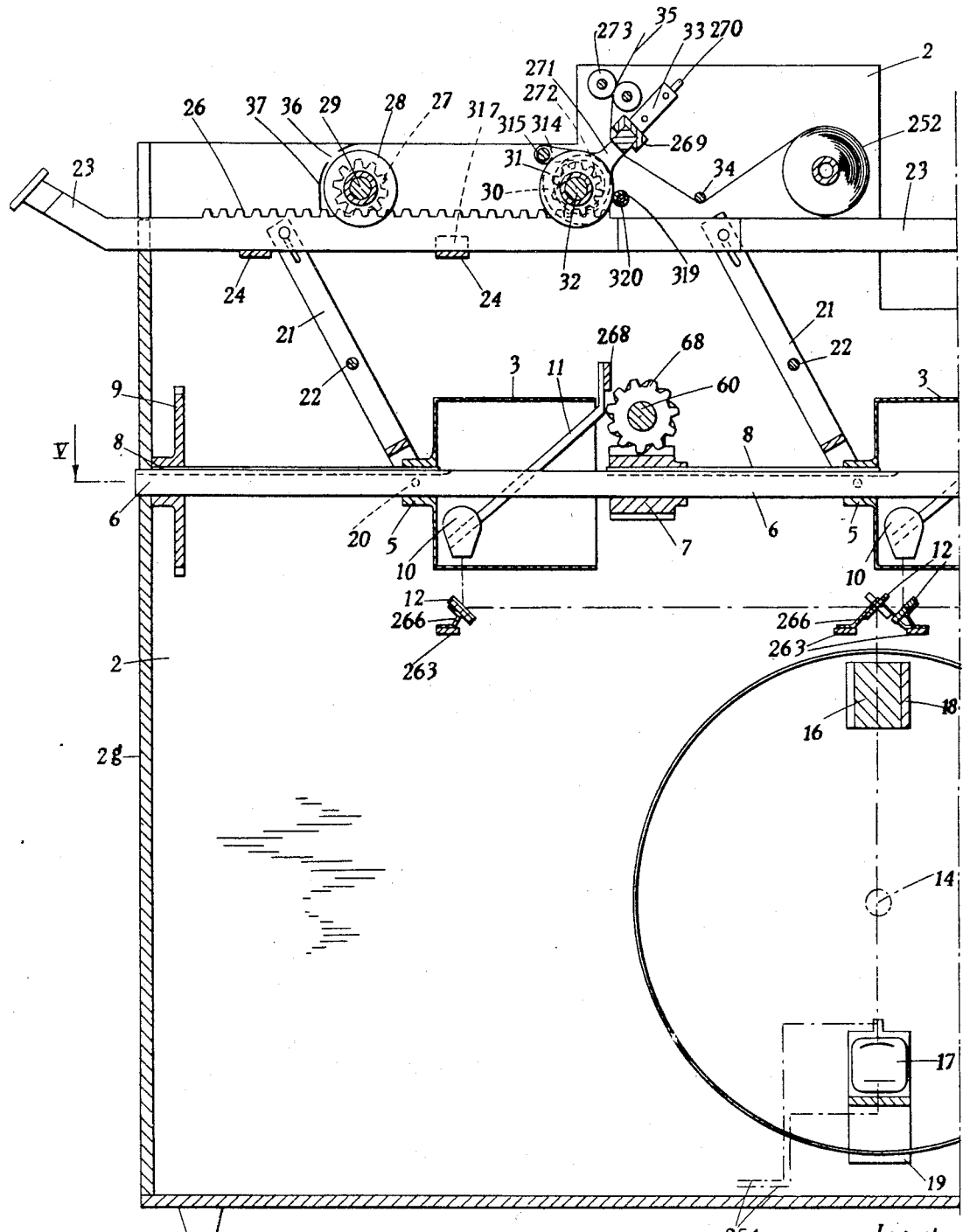

The pins 20 engage the slotted ends of fork levers 21 rockably mounted on rods 22 (Figure 2). Each pin 20 is yieldingly connected by a tension spring 183 (Figure 16) to the respective lever 21, so that when the screens 3 are rotated, as will be hereafter described, the rings 180 remain substantially stationary, their pins 20 being engaged by the fork lever 21 so as to shift the screens 3 along the shafts 6. Each of the fork levers 21 has a pin-and-slot connection with one of the multiplicand keys 23, Figure 2, slidably mounted in recesses in the front frame member 2g, and in bearings 24, the rear bearing 24 being provided with spacing blocks 317. Each key 23 is provided with a rack 26 in mesh with a gear 27 on a numeral indicating wheel 28 rotatable on shaft 29, and also with a gear 30 on a numeral type wheel 31 rotatable on shaft 32. In association with said type wheels 31 are a printing table 33 and a paper strip 35 to be described later on. When the keys 23 are shifted inwardly or outwardly, the multiplicand is shown by means of the numerals on the wheels 28 displayed in an opening 36 of a cover 37. Simultaneously, the corresponding numerals on wheels 31 are set opposite the printing table 33, and the screens 3 are set axially so that the circumferential rows of slots 4 thereon, each corresponding to a numeral of the multiplicand, are set in line with lamps 10, described more fully hereafter. Spring-loaded pawls 314 on a rod 315 secured to the frame members 2, 2d ensure exact alignment of the numerals on wheels 31 with regard to the printing table 33. As shown in Figure 18, each pawl 314 is depressed by an end of a torsion spring 316, the other end of which is inserted into a hole in the rod 315. The arrangement is such that when a certain numeral (for example, 3) on the wheel 28 appears in the aperture 36, the corresponding type (for example, 3) on the associated wheel 31 is brought into the printing position relatively to the printing table 33, and the associated multiplication screen 3 is shifted so that the circumferential row of slots 4 representing all partial products of this multiplicand numeral (in this example, 3) is set in line with the lamp housing 10 and the associated mirror 12. In this manner all keys 23 are operated (or left in the zero positions) so that the digits (or zeros) of the complete multiplicand appear in the aperture 36.

Multiplier setting mechanism

The multiplier is set by rotating the multiplication screens 3 around their axes, and for this purpose the hubs 5 of the screens 3 are furnished with key-ways to receive the keys 8 in the shafts 6. The hubs 5 are slidable along the keys 8 as already described, but they are compelled to rotate whenever the shafts 6 are turned. A gear 9 is fixed to each shaft 6 adjacent the front of the machine, all three gears 9 being in mesh (Figure 1A). One of the shafts 6 carries a spiral gear 7 rigidly fixed to it (Figures 1A, 2, 5A). This gear 7 meshes with another spiral gear 68 rigid on a shaft 60 which is driven by the multiplier setting mechanism in a manner presently to be described. It will be evident that a rotation of the spiral gear 7 results in a corresponding rotary movement of all three shafts 6 and therefore of all nine multiplication screens 3. Thus, it will be noted that the two outer shafts 6 (Figure 1A) rotate in the same direction, whereas the inner shaft 6 rotates in the opposite direction. Therefore, the screens 3 carried by the inner shaft 6 must be arranged accordingly, which can be effected simply by reversing the screens 3 when mounting the same on their hubs 5.

The multiplier setting mechanism shown in part B of Figure 1 comprises means for rotating the cylindrical screens 3 and locking them in a succession of angular positions, each position being individual to a numeral of the multiplier. The mechanism is best shown in Figures 4 and 5. A key 38 is provided for each denomination of the multiplier. The keys 38 are slidably mounted in recesses in the front frame member 2g, and are supported by bars or bearings 24, the rear bearing 24 being furnished with spacing blocks 317. The top and bottom edges of the keys 38 are provided with racks 39 and 40 respectively. The upper racks 39 are in mesh with gears 41 on indicating numeral wheels 42 rotatably mounted on the shaft 29, and also with gears 43 on numeral type wheels 44 rotatably mounted on the shaft 32. In a manner similar to that already described with reference to the multiplicand setting mechanism, the type wheels 44 are located by means of spring loaded pawls 314. When a numeral on one of the indicating wheels 42 is visible through the aperture 36 in the machine cover, the corresponding type on the associated type wheel 44 is brought into the printing position relatively to the printing table 33. The lower racks 40 are in mesh with gears 45, each of which is rigidly fixed by means of rivets 318 to ten numeral pre-selector cams 46 rotatably mounted on a shaft 47 (Figures 4 and 18). Each of the numeral pre-selector cams 46 is provided with a recess 48, said recesses being offset so as to come successively into line with noses 49 of levers 50 which are rockably mounted on a shaft 51 and are engaged by wire springs 250 fixed to a cross-bar 251, one lever 50 being provided for, and disposed so as to coact with, each cam 46. The rocking levers 50 are further provided with noses 52 and 53 adapted to coact with six denominational selector cams 54, one for each multiplier denomination, and a setting drum 55 respectively. The denominational selector cams 54 are secured upon a shaft 56 by means of a key 57, as is also a gear wheel 58 (Figures 4 and 5).

Each denominational selector cam 54 is provided with a recess 59 (Figure 4), the recesses being offset, so that on turning the shaft 56 by means of the gear 58, the recesses 59 are successively aligned with the noses 52 on levers 50 pre-selected by cams 46, as will be presently described. The setting drum 55 is secured upon a shaft 60 and is provided with six groups, one group for each multiplier denomination, of ten radially projecting stops 61, the ten stops of each group being evenly spaced around the circumference of the drum 55 and disposed along a helical line, so that each stop is axially disposed opposite an individual lever 50, and engages the nose 53 thereon when said lever is in the position shown foremost in Figure 4. In Figure 5 one stop 61 is turned into the plane of the drawing so as to show the construction.

One end of the setting drum 55 is recessed at 62 (Figure 5), and provided with ten evenly spaced conical depressions 63 arranged to coact with a driving pin 64 which is pressed into said depressions by a spring 65. The pin 64 is mounted to slide in a radial hole 66 provided in the hub of a gear wheel 67, freely mounted on the shaft 60. Rigid on the opposite end of the shaft 60 there is a spiral gear 68 meshing with a spiral gear 7 on one of shafts 6, the arrangement being such that on turning gear 7, all screens 3 are turned in unison by means of keys 8 and three intermeshing gear wheels 9. The gear wheel 67 on the shaft of the setting drum 55 and the gear wheel 58 on the shaft of the denominational selector cams 54 are driven by gear segments 69 and 70 respectively, both of said segments being secured to a shaft 71. The gear segment 69 carries a gear wheel 72, to which a drive is imparted from further gear wheels and shafts hereinafter to be described. The dimensions and setting of the gear segments 69 and 70 are such that on turning the gear 72, the gear segment 70 turns the gear wheel 58 for ⅙ of a full turn, and immediately afterwards the gear segment 69 turns the gear wheel 67 for a full turn.

Let it now be assumed that the cylindrical screens 3 have been set axially by means of the multiplicand keys 23 so that each screen is in a position corresponding to a numeral of the multiplicand, and that it is desired to set the multiplier. The multiplier keys 38 are depressed until the multiplier is indicated by the multiplier numeral wheels 42. Assuming that the units digit of the multiplier is 5, then movement of the units key 38 to indicate the numeral 5 will have resulted in the type numeral 5 on wheel 44 being set in line with the printing table 33, and also in the units group of numeral preselector cams 46 being turned so that the recess 48 on the sixth cam 46 (associated with numeral 5) is turned towards the rocking levers 50, so that only the sixth lever 50 of the units group can turn anti-clockwise with its nose 49 into said recess 48 when permitted to do so by its corresponding denominational selector cam 54. If the shaft 71 is now driven, gear segment 70 turns gear 58 for ⅙ of a revolution, and the recess 59 on the units denominational selector cam 54 allows that one lever of the units group of rocking levers 50, permitted to do so by the numeral selector cams 46, to turn anti-clockwise. Therefore only the sixth lever 50 (associated with numeral 5) of the units groups will be brought into the working position. The gear segment 69 now turns the gear 67 for a complete turn, thereby turning the setting drum 55 by means of the spring-loaded pin 64·until said drum is arrested by one of the stops 61 engaging the nose 53 on the rocking lever 50 which has turned anti-clockwise, in this instance the sixth lever, and accordingly the sixth stop, which results in drum 55 and consequently all the nine screens 3 geared thereto being turned for 5/10 of a full turn. It will be understood that the first preselector cam 46, the first rocking lever 50, and the first stop 61 in each group are reserved for zero. As all screens 3 have been previously set axially by the multiplicand keys 23 according to the digits of the multiplicand, said screens are now in positions in which the slots 4 representing the products of the multiplicand digits by the units multiplier digit, in this case 5, are immediately below lamps 10 hereafter described. Images of said illuminated slots are then scanned by the scanning cylinder 13, which is driven by means hereinafter described. The gear segment 70 now turns the gear 58 for a further 1/9 of a revolution, first disengaging the lever 50 of the units group from the recess 59 and from the drum 55 and thereafter bringing the recess 59 on the tens denominational selector cam 54 into a position which allows the tens group of rocking levers 50 to turn anti-clockwise. Only that one lever 50 of the tens group permitted to do so by the tens numeral selector cams 46 can swing out to engage the setting drum 55 which sets the multiplication screens 3 according to the tens digit of the multiplier. The scanning drum 13 is then again rotated and the process repeated for each denomination of the multiplier. For setting zero, the drum 55 remains stationary, being arrested by the first rocking lever 50 of the respective denominational group.

*Optical scanning device*

Inside each screen 3 a source of illumination (denoted generally 10 in Figure 2) is mounted on a bracket 11 fixed to a cross-bar 268 secured to the frame members 2, 2a. The arrangement shown in detail in Figure 14, comprises a casing 10, an electric lamp 174 mounted in the casing and supplied with current from wires 176, a parabolic reflector 177, and a suitable lens 178. An approximately parallel beam of light is projected downwards through an aperture 175, and it can be accurately focussed by adjusting the lens 178, which is slidably mounted in the casing 10 and can be shifted by a lug 179. The size of the aperture 175 is such that just one product area on the screen 3 is illuminated; as the screen is opaque, the light can pass only through slots 4 representing the partial product. Beams of light from the lamps 10, passing through the screens 3, are directed by an arrangement of mirrors 12 carried on brackets 266 mounted on cross-bars 263 onto a scanning cylinder 13, mounted on shaft 14, the general arrangement being shown in Figures 2, 12, 25 and 26.

In Figure 12 the nine screens 3 are distinguishable respectively by the Roman numerals I–IX, each Roman numeral denoting the multiplicand denomination with which the screen is associated. Nine mirrors 12, inclined at an angle of approximately 45°, are arranged in line above the scanning drum 13. These nine mirrors are also distinguishable respectively by Roman numerals I–IX. Beams of light from the screens 3 (I–IX) are directed respectively onto the correspondingly denoted mirrors 12 (I–IX) by means of a second series of mirrors 12¹, each one of which is arranged below a corresponding screen 3 at an angle of approximately 45° so as to direct the beam of light horizontally towards the vertical centre plane of the drum 13, hereinafter referred to as the scanning plane, and the mirrors 12 (I–IX) are disposed in the scanning plane above the drum 13 so as to direct the beams downwardly towards the axis of the drum 13. The mirrors 12, 12¹ are, in addition, slightly turned around their vertical axes so as to cause the associated beams I–IX to illuminate adjacent areas I–IX along a line on the top of the drum 13, viz: in the scanning plane. These areas are indicated in Figure 12 by dot-and-dash rectangles, but actually only one sub-division within each area will be illuminated, according to the position of a slot 4 on the respective product area on the associated screen 3. By way of example, the arrangement of the screen 3 (I) and associated reflectors 12, 12¹ is clearly shown in Figures 25, 26.

For the purpose of easy adjustment the brackets 266 of the reflectors 12, 12¹ are conveniently made of a material that remains in any set position, or they may be made adjustable on the cross-bars 263 in any suitable manner.

A series of slots 15 is arranged along a helical line on the circumference of the scanning cylinder 13, as hereafter more fully described with reference to Figure 13, so that as said cylinder is revolved, the light beams reflected by mirrors 12 impinge consecutively upon a condensing lens 16 and illuminate a photocell 17 mounted on brackets 18 and 19 respectively inside the scanning cylinder 13 (Figures 1 and 5). The photocell 17 is connected by wires 254 to an amplifier device generally designated 253, comprising a supply of current and the necessary resistances, amplifiers, condensers, etc., of any known construction.

The scanning cylinder 13 is illustrated, in development, in Figure 13 in association with the mirrors 12 (I–IX) identifying the nine denominations of the multiplicand with which they are respectively associated. The dash lines between the mirrors and the slots in the scanning element illustrate the possible paths of beams of light from different digital areas on the mirrors to the scanning element. The mirrors 12 are marked with the corresponding digital areas, these areas being denoted on mirror 12 (II) and 12 (VIII) by the numerals 0–9, both for the units and for the tens sub-divisions.

The rectangular areas marked in full lines on the mirrors 12 are images of illuminated perforations in the set screens 3, and correspond to the partial products shown, by way of example, at the top of the figure, the remaining parts of the surfaces of the mirrors being shown shaded to indicate that they are not illuminated. It will be understood that the mirrors 12, 12¹ are so adjusted that the positions of the illuminated portions of the mirrors 12 correspond exactly to the respective slots 4 on the screens 3, and that the reflected light beams are directed at right angles on to the drum 13.

The groups of scanning slots co-operating respectively with the mirrors 12 (I–IX) are similarly marked (I–IX), and the slots which pass through the scanning plane during the drive of any one driving sector 99a–j (hereinafter described) are shown associated with that sector. The scanning slots 15 are arranged in staggered order on the periphery of drum 13, one group comprising twenty slots 15, ten slots for the units and tens slots for the tens, being provided for each mirror 12, i. e. for each partial product. The scanning slots 15 in each group are arranged in exact axial alignment with the corresponding subdivisions of the respective product areas on the mirrors 12, as indicated by the dash lines, and they are so off-set around the periphery of the drum 13 as to form an approximately helical line.

When the drum 13 is turned, one scanning slot after another is moved into the scanning plane. If it be assumed, as shown in Figure 13, that the first partial product as represented by light beams reflected from the first mirror 12 (I) is "12", then only the sub-division "2" of the units sub-area and the sub-division "1" of the tens sub-area of the imaginary sub-divisions on the mirror (I) will be illuminated, the rest of the sub-divisions reflecting no light on to the drum 13. Therefore, when the drum 13 is turned, and the first or "0" units slot 15 of the group I is brought into the scanning plane, no light will pass to the interior of the drum 13. The same will be the case when the second or "1" units slot 15 of this group is in the scanning position. However, when the third or "2" units slot 15 of group I is brought into the scanning plane, it will be aligned with the sub-division "2" of the units sub-area on the mirror 12 (I); as this sub-division is illuminated, light reflected therefrom will penetrate into the interior of the drum 13, and, after passing through the lens 16, will fall upon the cell 17 which then will actuate the transmission mechanism as will be described hereafter. On further rotation of the drum 13, no more light will pass to the cell until the twelfth or "1 tens" slot 15 of the group I is aligned with the corresponding "1" sub-division of the tens sub-area on mirror I, when light will again penetrate to the cell 17. In this manner all scanning slots 15 are successively brought into the scanning plane, and whenever the portions of the mirrors 12 they are aligned with are illuminated, light will pass through to the cell 17, and produce electric impulses. Thus, the partial products represented by differently positioned light beams are transformed into timed impulses of the photocell 17, as the cell is actuated during the revolution of the scanning drum 13 at different moments in strict accordance with the positions of said light beams.

In order to compensate for the cylindrical shape of the screens 3, the size of the slots 4 is such that the slots 4 more remote from the centre plane of the screens still produce a beam of light of sufficient width for scanning. In other words all the slots are made somewhat wider than would be strictly necessary if a flat screen were employed, small spaces being left between adjacent slots. These small spaces are not shown in Figure 13.

Result transmitting mechanism

In order that the result transmitting part C of the mechanism about to be described may be readily understood, the arithmetical processes carried out by the machine will now be described. By way of example, let it be assumed that the keys of the multiplicand and multiplier set-up have been set so as to indicate 561532754 and 280753 respectively, and that the multiplier setting mechanism is driven. As a result of the first operation, i. e. multiplying by the 3 units of the multiplier, eighteen small illuminated areas corresponding to the light spots on mirrors 12 in Figure 13, appear along a line on the scanning member 13. These areas represent, by virtue of their positions along said line, the first sub-product, i. e. the result of multiplying 561532754 by 3, and are arranged as nine two-digit groups as follows:

15 18 03 15 09 06 21 15 12
ji ih hg gf fe ed dc cb ba as indicated at the top of Figure 13.

It is clear that the numerals marked a are units, those marked b are tens, those marked c are hundreds, and so forth. The result transmission mechanism about to be described transfers the first sub-product set out above to the first ten or fifteen result indicating numeral wheels lettered for convenience 73a–73o (Figure 8) in eighteen successive turning movements of varying amounts. For instance, the units or a wheel is turned 2/10 of a revolution by means to be described later on, the tens or b wheel is turned twice, firstly 1/10 of a revolution and secondly 5/10 of a revolution; the hundreds or c wheel is also turned twice and so on, until the highest denomination of the sub-product is reached when the j wheel is turned once only, i. e. 1/10 of a revolution.

In the case of zero values the corresponding numeral wheel is not turned in respect of such values; thus, in the example above given the e wheel will be turned only once, i. e. 9/10 of a revolution.

The transfer of the first sub-product having been completed, the multiplier setting mechanism causes the screens to take up another position, in which a further eighteen small illuminated areas appear on the scanning member representing:

25 30 05 25 15 10 35 25 20
kj ji ih hg gf fe ed dc cb namely, the second sub-product 561532754 by 5.

It will be apparent from the above that no units appear in the second sub-product, and that each illuminated area is increased in representative value ten times. This second sub-product is therefore transferred to the ten result indicating numeral wheels b–k. The process is repeated until the last or sixth sub-product has been transferred to the last ten result wheels f–o, thereby completing the multiplication. The result wheels are of course provided with tens transfer devices. As these devices are similar to the tens transfer devices associated with the accumulator fully described hereafter, they will be described later.

The transmission mechanism, shown in part C of Figure 1 and in Figures 6–11, operates during each revolution of the scanning member 13 while the setting mechanism is at rest, that is, during the inoperative part of each revolution of the gear segments 69 and 70, and consists of a number of transmission units, one transmission unit for each denomination of the result, which is fifteen in the embodiment described. As shown in Figures 6–9A, each transmission unit comprises essentially a numeral type wheel 73 (on shaft 32) driven from a gear wheel 74 (on shaft 91) by gear wheels 75 (on shaft 297) and 76, a tens transfer device on shaft 274, an accumulator numeral wheel 77 driven from gear wheel 76 by gear wheels 79, 78, a clutch member 80 with driving pin 81 on shaft 91, slidably mounted on toothed sleeve 82 but prevented from rotating thereon by a key 83, and a clutch fork 84 rockably mounted on a pivot 85 on a bar 86. Each clutch fork 84 is adapted to operate its clutch member 80 by means of two pins 87 (Figure 7). Further, each clutch fork is provided with an extension 88 and is under the influence of a spring 89 tending to disengage the clutch member 80 from the gear wheel 74. The clutch forks 84 are adapted to be operated by a relay 90 (common to all clutch forks) mounted on a bracket 264 secured to the frame member 2d, which relay is controlled by the aforesaid photocell 17 through the amplifier device 253 to which it is connected by wires 255. The clutch assemblies are mounted on a common shaft 91. The driving pin 81 on each clutch member 80 is adapted to engage in one of a plurality of holes 81¹ (Figure 9) provided in its respective gear wheel 74. The number of holes 81¹ in each gear wheel 74 corresponds to the number of type numerals on the numeral type wheel 73 with which it meshes, the holes being equally spaced as are also the type numerals.

Normally (i. e. when the photocell 17 is not actuated) the relay 90 is energised, and attracts all clutch forks 84, so that all clutch members 80 are in engagement with gear wheels 74.

As shown in Figures 5 and 6, spoked discs or cams 92 (one of which is shown complete in Figure 27) provided with hubs 93, are keyed, together with a wide pinion 94, upon a sleeve member 95 revolubly mounted on a shaft 96. Said cams 92 and pinions 94 are rigidly clamped against an enlarged end portion 97 of the sleeve member 95 by means of a nut 98. The cams 92 are adapted to coact with the extensions 88 of the clutch forks 84 so as to maintain the clutch members 80 in positive engagement with their corresponding gear wheels 74. Around a portion of the periphery, however, of each cam 92 is an axially displaced portion in which the clutch fork 84 is free to move and disengage its clutch member 80, as shown on the left of Figure 9A, when said clutch fork is released by the relay 90. An arcuate rack 99 is formed upon each cam 92 along said axially displaced portion (see Figure 27) said rack being adapted to mesh with the toothed sleeve 82 of the clutch assembly controlled by the said cam 92. The relative circumferential lengths of the ten arcuate racks 99 are shown in Figure 6. The first and last racks 99a and 99j respectively are of a length sufficient to turn a toothed sleeve 82 one revolution, and the remaining racks 99b-99i are twice the length, so as to turn a toothed sleeve 82 two revolutions. The arrangement is such that on turning the sleeve member 95 the first (on the right in Figures 5 and 8) arcuate rack 99a turns the clutch assembly of the first (units) numeral type wheel 73a one revolution; then, the second arcuate rack 99b turns the clutch assembly of the second (tens) wheel 73b two revolutions, and so on, until the last (10th) arcuate rack 99j turns the clutch assembly of the wheel 73j one revolution. The purpose of cams 92 is, firstly, to ensure that when an arcuate rack 99 commences to turn the corresponding toothed sleeve 82 for the first or for the second revolution, the respective clutch member 80 is in engagement with the corresponding gear wheel 74, as shown on the right of Figure 9A; and, secondly, to prevent all other clutch forks 84 from being disengaged from the relay 90 when the latter is actuated. Therefore, the axially displaced portions of the cams 92 are circumferentially off-set in the same manner as the arcuate racks 99, as shown in Figures 1C, 6 and 27, so as to ensure consecutive operation of the clutch assemblies. In order to bring the clutch member 80 into engagement with its gear wheel 74 after the first revolution of the latter, all cams 92 (with the exception of the first and the last) are furnished in the middle of the displaced portions with an elevated stud or cam portion 321 (Figures 1 and 27). This cam 321 occupies the width of one tooth, and is spaced by one tooth width from the first tooth of the second set of nine teeth for the purpose hereafter described.

The entry of a digit of a sub-product into the register is effected in the following way:

Let it be assumed that, owing to the position of a multiplication screen 3 relatively to its source of light 10, the beam of light represents, say, the numeral "6" of the first denomination. This beam is directed on to the scanning cylinder 13 so that when the latter is rotated, a scanning slot 15 individual to this numeral of this denomination will at a certain moment coincide with the beam of light, as already described. The arcuate beam racks 99a, 99b, etc., move in synchronism with the scanning cylinder 13; therefore, the first rack 99a causes the first toothed sleeve 82 to rotate, so that the clutch member 80, gears 74, 76, 75 and the numeral wheel 73 are also rotated (Figures 6, 8, 9). The arrangement is such that a certain numeral on the wheel 73 is turned towards the printing pad 33 exactly when the corresponding slot 15 coincides with the beam of light. Therefore, when the slot 15 individual to "6" coincides with the beam of light, the numeral "6" on the wheel 73 is in the printing position. As at this moment the light impinges on the photocell 17, it causes the relay 90 to release the first clutch fork 84 (all other clutch forks being locked by their cams 92), which swings clockwise under the influence of the spring 89, as seen on the left of Figure 8. Thereby, the clutch member 80 is released from the gear 74, and the drive of the wheel 73 is interrupted. The numeral wheel 73 is located in this position by means of a pawl 314a on shaft 274a, which pawl is pressed by spring 316a anchored on a rod 315a, so that the numeral "6" is ready to be printed. Now, the second digit is similarly transferred to the register, and in this manner the transmission units are operated in consecutive order, and the consecutive digits are transferred to the register 73 and also to the accumulator 77.

In case of zero light will impinge on the photocell before the corresponding numeral wheel is driven, and, consequently, the associated clutch fork 84 will disengage the drive from the numeral wheel before it begins to turn. Consequently "0" on the numeral wheel remains in the initial position in which it is ready for printing. In this connection it is observed that the space equal to the width of one tooth between the cam 321 and the first tooth of the second set of nine teeth 99 on the cam 92 comes into operative position relatively to the bush 82 at the precise moment when the associated zero slot 0 on the scanning drum is in the scanning position.

The pinion 94 on the sleeve member 95 (Figure 5) is turned by means of a gear segment 100 on a shaft 101 driven by a gear wheel 102. On the same shaft 101 is mounted another gear segment 103. The enlarged portion 97 on the sleeve member 95 is provided with a disc 104 which holds a flange 105 on one end of a threaded sleeve 106, said sleeve 106 being in threaded engagement with a nut device 107, revolubly mounted, but normally stationary, in a frame member 2d. A further wide pinion 108 is secured to the other end of the threaded sleeve 106 by means of a key 109 and a nut 110.

The arrangement is such that initially the first arcuate rack 99a (on the right) is in line with the toothed sleeve 82 associated with the first (units) numeral wheel 73a. On turning the gear wheel 102 in a manner to be presently described, the gear segment 100 turns the pinion 94 for a full turn, during which the arcuate racks 99 drive the numeral wheels 73 they are in line with, as described above, in order to transfer the first sub-product. When one turn of pinion 94 is completed, the gear segment 103 begins to turn the pinion 108, and consequently the threaded sleeve 106 turns in the nut device 107, which is locked by means to be described later on, and moves axially to the left, thereby pushing the sleeve member 95 in the same direction. The ratio of the gearing and the pitch of the thread is such that when segment 103 has just finished turning pinion 108, the arcuate racks 99 have just moved longitudinally for one step, i. e. to the next higher numeral wheels 73b–k, so that the next sub-product may be transmitted. A gap 111 (Figure 6) is provided in the cams 92 to permit of this longitudinal movement. Of course, segments 100 and 103 are circumferentially displaced so as to come into action consecutively.

*Accumulator and zeroising device*

These devices are well known in the art and form no part per se of the present invention.

As shown in Figures 6, 8 and 19, the gears 76, which are driven by the clutch assemblies and which, in turn, drive the register type wheels 73, also drive the accumulator type wheels 77.

As shown in Figure 19, the gears 76 on shaft 297 are in mesh with gears 79 on shaft 302, which are better shown in Figures 22, 23 and 24. The gears 79 actuate a one-way drive for the accumulator wheels 77. A ratchet pawl or spring 304 is fixed to the face of each gear 79 (Figure 24), which coacts with a ratchet wheel 303, on which is rigidly mounted a gear 305 meshing with a gear 78 on shaft 306 (Figure 22). Rigidly mounted on the gears 78 are accumulator type wheels 77 and also trip-wheels 307 and one-tooth pinions 308 of a Geneva type tens-transfer device. The one-tooth pinions 308 are arranged, upon full revolution, to engage a gear 312 mounted on shaft 274, and to turn it one step. In alignment with the single tooth of each pinion 308 is a recess in the trip wheel 307, which coacts with a locking wheel 309, riveted or otherwise fixed to the gear 312. The bore of the gears 312 and locking wheels 309 is serrated so as to form a ratchet with which coacts a flat spring 311 fixed to, and mounted in, the hub of a gear 310 meshing with the gear 78 of the next higher denomination. When the one-tooth pinion 308 turns its associated gear 312 one step in the direction shown by the arrows in Figures 23 and 24, the spring 311 is in engagement with the ratchet teeth on gear 312 (and locking wheel 309), and it causes the associated gear 310 to turn a corresponding amount; consequently, since the gear 78 is in mesh with the gear 310, the accumulator wheel 77 of the next higher denomination is also turned one step, and the tens transfer thus effected. If this wheel 77 of the next higher denomination is now turned by its own driving means, the next lower accumulator wheel 77 is not affected, as the gear 310 now turns in the direction of the arrows, and the spring 311 skips the ratchet teeth of 309, 312, a suitable recess being provided in the hub of the gear 310 as shown.

It may here suitably be observed that the tens transfer device associated with the numeral wheels 73 (see Figures 22A, 8 and 6A) comprise carry devices 307a and 308a (similar respectively to the parts 307, 308) cooperating with parts 309a, 310a, and 312a (similar respectively to the parts 309–312) on shaft 274a (similar to shaft 274). The gear 310a is provided with a spring (similar to spring 311) fixed into its hub so as to cooperate with ratchet teeth cut into the parts 309a and 312a, as shown in Figures 22–24 for the corresponding parts 309 and 312. The operation of this tens transfer device for the numeral wheels 73 is identical with that for the wheels 77.

After the result has been printed by means to be described later on, the register type wheels 73 are zeroised in the following manner.

As shown in Figures 19–21 a shaft 290 is arranged adjacent the intermediate shaft 297, and on this shaft 290 a gear 295 is provided in line with each intermediate gear 76. The gears 295 are spring-loaded, one end of a torsion spring 296 being fixed to each gear 295, and the other end to the shaft 290. As shown in Figure 21, the gears 295 are recessed adjacent the intermediate gears 76, so that the latter are free to rotate without meshing with gears 295. After the printing is effected, a gear 291 rigid on shaft 290 is rotated by means to be described later on, and causes the shaft 290 to rotate. A face cam 293 is rigidly fixed to the opposite end of the shaft 290, and a comb-like stop bar 298, slidably mounted in a key-way in the shaft 297, is kept in engagement with the face cam 293 by means of a pressure spring 299. Each intermediate gear 76 has, on one side, a zero stud 301, and the stop bar 298 is furnished with a corresponding number of stop lugs 300. Normally the cam 293 maintains the stop bar 298 in a position shown in Figure 20, in which the stop lugs 300 are not in line with the zero studs 301, so that the intermediate gears 76 are free to rotate when driven by the clutch-driven gears 74 (Figure 9). However, when the gear 291 starts to turn the shaft 290, the cam 293 immediately releases the stop bar 298, which is then brought by its spring 299 into the position of Figure 19 whereby the stop lugs 300 and the zero studs 301 are in alignment. Therefore, when the shaft 290 causes the zeroising gears 295 to rotate, they turn the associated gears 76 until the studs 301 are stopped by the lugs 300 in the zero position. Two cams 292 are fixed to the shaft 290 and coact with studs 313 fixed to the frame members 2c, 2d. Near the end of the zeroising revolution the cams 292, pressing upon the studs 313, push the shaft 290 away from the studs 313 and also from the gears 76, the shaft 290 being mounted in slots in the frame members, and compression springs 294 being provided to keep the cams 292 in contact with the studs 313, in the position of Figure 20. The zeroising gears 295 are now out of mesh with the intermediate gears 76, and the springs 296 cause the zeroising gears 295 to swing further into the initial position of Figure 21.

*Printing mechanism*

The printing mechanism per se forms no part of the present invention; it is substantially similar to that described in the specification of my prior patent application Serial No. 144,022. As shown in Figures 1, 2, 4, 6 and 8, pads 269, mounted in a bracket 33, are provided for printing the multiplicand, the multiplier, and the result after each calculation. The bracket 33 is fixed at each end by means of screws to a pitman 271, and the shafts of the screws serve as guides in the slots 270 in the frame members 2 and 2d. The pitmans 271 ride on eccentrics 272 keyed to the shaft 32 of the type wheels 31, 44, 73, to which is also keyed a gear 280 driven after each calculation by means hereinafter described. When the gear 280 is turned, it causes the eccentrics 272 to rotate, and the pitmans 271 pull the bracket 33 towards the shaft 32, so that the pads 269 take an imprint from the type wheels 31, 44, 73 on to a web of paper 35 drawn from a reel 252 by paper feed rollers 273 and guide roller 34. The drive of the paper feed rollers is well known in the art and is fully described in my above mentioned prior application, so that it is not thought necessary to repeat the description thereof. The ink is applied by an ink roller 319 mounted on a shaft 320 secured in the frame members 2 and 2d, the ink roller being made of suitable material which is saturated from time to time with ink, which is then taken up by the types on the wheels 31, 44, 73 as they touch the ink roller when passing by. For printing the accumulated totals, an additional printing pad 275 (Figure 6) is arranged in a bracket 133 adjacent the accumulator wheels 77. The bracket 133 is fixed at each end to a yoke 276 mounted on a pivot 279 secured to the frame members 2c and 2d respectively. The yokes 276 are loaded in the clockwise direction by means of springs 277, and are interconnected by means of crossbars, to one of which is fixed a handle 278. When it is desired to print the accumulated amount, the handle 278 is pulled towards the front of the machine, and the printing pad 275 takes an imprint from the type wheels 77 on to the paper web 35, whereupon it is restored by the spring 277. The ink is supplied by the ink roller 319 as already described with reference to the type wheels 31, 44, 73. In the machine shown in the drawings no provision is made for zeroising the accumulator, as this is not required for the special purpose for which the machine is designed; but if so required, a zeroising device similar to that already described with reference to the register 73 may be used, this zeroising device being actuated by the return movement of the yokes 276.

*Driving mechanism*

The machine is driven by a motor 256 mounted on the base plate 1. As shown in Figure 5, a pinion 257 fast on the motor shaft meshes with a gear 258 rigid on a shaft 267 journalled in the frame members 2d, 2e, a pulley 259 being rigidly mounted on the shaft 267. The pulley 259 drives, by means of a belt 260, a bigger pulley 261 loosely mounted on the shaft 112 and arranged to drive a one-revolution clutch 262 of any known construction. In the preferred embodiment, a clutch member 322 (Figure 1) is fixed to the pulley 261, and the coacting clutch 262 is slidably keyed to the shaft 112, a spring 323 pressing the clutches together. The other end of the spring 323 rests on a collar of a distance tube 324 furnished with prongs 325 (best shown in Figure 10) resting on the side of the frame member 2d. An arm 326 is fixed to the clutch 262; said arm resting normally on the upper surface of a lever 327, pivoted at 328 (Figure 1) in a bracket 329 secured to the front frame member 2j, the other end of the lever 327 being formed as a grip 330 projecting through a slot in the frame member. A tension spring 331, secured to a stud 332 fixed to the frame member 2j, keeps the lever 327 just underneath the arm 326 of the clutch 262 which thus cannot rotate with the clutch member 322 and is forced back against the pressure of the spring 323. However, when the grip 330 is moved to the right, the lever 327 releases the arm 326, and as soon as the clutch 262 is again engaged by the clutch member 322, it is free to rotate therewith. As soon as the grip 330 is released, the spring 331 restores the lever 327 into the initial position, and after completing one revolution the clutch 262 is again stopped.

The multiplier setting mechanism, the scanning drum, and the transmission mechanism are driven from the main operating shaft 112. Intermediate gearing is provided so that all the turning movements necessary for a multiplication are imparted to the above mentioned mechanisms at the correct relative speeds and sequences during one revolution of the main shaft 112. The said shaft 112 is provided with a gear wheel 113 adapted to mesh with a pinion 114 (Figure 10) fast on an intermediate shaft 115, the ratio of the gearing being such that shaft 115 makes six revolutions to one revolution of the shaft 112. Gear wheels 116 and 117 on shaft 115 (Figure 1) mesh in 1:1 ratio with the aforesaid gear wheels 102 and 72 of the transmission and multiplier setting mechanisms respectively (Figures 1, 5, 6). A further gear wheel 118 on the shaft 115 meshes with a gear wheel 119 on a shaft 120, and a gear segment 121 mounted upon the gear wheel 119 meshes with a gear wheel 122 on the shaft 14 of the scanning cylinder 13. One revolution of the gear segment 121 is adapted to turn the shaft 14 once. The arrangement is such that the multiplier setting mechanism, scanning cylinder, and transmission mechanism are each driven by means of gear segments, whereby they are given an intermittent motion consisting of a series of complete turns alternating with periods of rest. The gearing is timed so that the transmission mechanism (i. e. the sleeve member 95 carrying cams 92 and arcuate racks 99) and the scanning cylinder are in synchronism, whereas the multiplier setting mechanism is only driven during the periods of rest of the said transmission mechanism and scanning cylinder.

After the completion of one revolution of the shaft 112 it is necessary to effect the return axial movement of the assemblage of arcuate racks 99 and cams 92, for which purpose the nut device 107 is provided with a toothed rim 123 (Figures 10 and 11). It is axially located by means of a disc 265, furnished with a notch into which a stop pawl 124, slidably mounted in a bearing 125, is pushed by a spring 126. The other end of the stop pawl 124 is suitably bent so as to coact with an internal cam 127 provided on the gear wheel 113. The gear wheel 113 also drives a pinion 128 secured to a disc 129 revolubly mounted on a bearing stud 130. One end of a spiral spring 131 is attached to said disc 129, and the other end to a gear wheel 132, revolubly mounted on the hub of disc 129 and adapted to mesh with the toothed rim 123 on the nut device 107. On turning the gear wheel 113, the spring 131 is wound up and tends, as shown by the dotted arrow in Figure 10, to turn gear 132 and nut device 107, which, however, is locked by the stop pawl 124. After a complete turn of gear wheel 113, the cam 127 pulls back the pawl 124 and releases the nut device 107, which is now turned by the spring 131. This causes the threaded sleeve 106 to move axially to the right (as viewed in Figure 5) thereby bringing the sleeve 95 and the arcuate racks 99 back into their initial axial position. It will be understood that the sleeve 106 is prevented from turning when the nut device 107 is being turned by the gear wheel 132, as the gear segment 103 is still in mesh with the gear 108.

The printing mechanism is actuated by the rotation of the gear 280 on shaft 32, and the zeroising operation is effected by rotating the gear 291 on shaft 290, as already described. The drive of these gears 280 and 291 will now be described.

As shown in Figures 10 and 11, the toothed rim 123 of the nut device 107 is in mesh with a gear 281 integral with a stump shaft journalled in the frame member 2d, to which shaft are rigidly fixed two gear segments 282 and 283 which are mutually offset so as to turn the associated gears successively. The gear segment 282 is arranged to mesh with an intermediate gear 284 journalled on a trunnion 285, said gear 284 meshing with a further gear 286 on a trunnion 287. This gear 286 is in mesh with the gear 291 secured to the zeroising shaft 290. The gear segment 283 is arranged to mesh with an intermediate gear 288 on a trunnion 289, said gear 288 meshing with the gear 280 keyed to the printing shaft 32. The arrangement is such that when a calculation has been completed, the cam 127 withdraws the pawl 124 from the disc 265, as already described, and the spiral spring 131 causes the gear 132 to rotate as shown by the plain arrow in Figure 10, turning the toothed rim 123, the gear 281 and the gear segments 282, 283. The latter gear segment 283 comes into action first, turning the gears 288, 280 and the shaft 32 and so effecting the printing operation. Thereafter, the gear segment 282 starts to turn the gears 284, 286, 291 and the shaft 290, thus effecting the zeroising operation. At the same time, the transmission mechanism is being restored as already described. When the pawl 124 is again released by the cam 127, when it again coincides with the recess in the disc, it locks the disc 265 of the nut device 107 and the machine is ready for another calculation.

*Timing chart*

Figures 17A and 17B together represent a complete timing chart for the whole cycle of operations. Figure 17A illustrates in six stages or cycles the complete operation corresponding to one complete revolution of the main drive 112, gear 113, and cam 127. As shown at the top of the figure, each of these cycles corresponds to one complete revolution of gears 114, 117, 72, 118, 119 and 116, 102. The seventh (printing) cycle of operations, consequent on the release of the spring 131, corresponding to a complete return revolution of the nut 107, is illustrated separately in Figure 17B.

*Modified multiplicand setting mechanism*

A modification of the mechanism designated generally by the letter A in Figure 1 is shown in Figures 28-30. The scanning cylinder 13 is arranged vertically on a shaft 334 rotatable in a bearing 336 fixed to the base plate 1. Fast on shaft 334 is a spiral gear 335 meshing with another spiral gear 337 secured to the shaft 14, which is arranged and driven as already described. The multiplication screens 3¹ are subdivided into product areas and are slotted exactly like screens 3; however, they are not cylindrical but flat, being each furnished with a rack 135 and mounted in a common vertical frame 134, 333 supported by a number of cross-bars 138. The racks 135 are arranged to mesh with gears 136 on a shaft 139 (identical with shaft 29, Figure 2), each gear 136 being rigidly fixed to an indicating wheel 28 (visible through a viewing slot 36 in the cover 37), and to a pinion 137 driven by a rack 26 on a key 23 slidably mounted in bearings 24. The keys 23 set numeral type wheels 31 co-operating with paper web 35 and a printing device 33 as already described. A non-transparent selector ribbon 140 provided with a number of transparent areas or slots 141 passes around drums 142, 143, and is arranged to be moved by the drum 142 which is secured to a shaft 144 journalled in a bearing 341 fixed to the front plate 2g. The drum 143, mounted on shaft 345 in a bearing 346 secured to the side plate 2 (Figure 29) is arranged to rotate idly when the ribbon 140 is moved by the other drum 142. Rigid on shaft 144 of the drum 142 is a bevel gear 348 meshing with another bevel gear 349 fast on a shaft 350 journalled in a bearing 351 (Figure 30). The opposite end of the shaft 350 is provided with a further bevel gear 352, in mesh with a bevel gear 353 fast on a shaft 354, journalled in bearing 355 secured to the side member 2a, and furnished with another bevel gear 356 meshing with a bevel gear 357 rigidly fixed to the shaft 60, arranged and driven as already described in accordance with the set multiplier numerals. A lamp 343 is mounted on brackets 344 between the two runs of the ribbon 140. Lenses 145, 146 are mounted on cross-bars 147, 148, respectively, behind each of the screens 3¹, in such a manner that, irrespective of the positions of the slots 141, a light beam projected through each slot is directed on to a mirror 12 supported by a bracket 338 secured to a common bar 339, which is fixed to the side plate 2 and to a standard 340 secured to the base plate 1. The mirrors 12 (identical with mirrors 12 in Figure 2) are each turned around the vertical axis so as to project the beam of light on to a further series of mirrors 12 on brackets 341 secured in a standard 342 fixed to two cross-bars 138, so that all beams of light are reflected on to the vertical plane of the axis of the scanning cylinder 13, as best shown in Figure 30. Each mirror 12 is further tilted around its horizontal axis so that the various beams are projected on to different areas disposed vertically one above the other along the front of cylinder 13, as shown best in Figure 28, the various beams being indicated by dot-and-dash lines.

The multiplicand is set by pressing the keys 23, which cause the associated numeral wheels 28 to turn, and the multiplication screens 3¹ to move upwards, until the desired numeral appears on each wheel 28 in the aperture 36. In this position, the corresponding product areas on screens 3¹ are set in front of the lamp 343. The multiplier is now set in exactly the same way and by the same mechanism as hereinbefore described with reference to Figure 4, a setting drum 55 on shaft 60 turning through bevel gears 357, 356, shaft 354, bevel gears 353, 352, shaft 350, bevel gears 349, 348, the shaft 144 of the drum 142, which moves the selector ribbon 140 in front of the screens 3¹ and consequently unmasks the product areas thereon corresponding to the successive multiplier numerals. Thus, the proper result slots 4 are exposed to light, and the resulting beams of light are scanned by the cylinder 13 as already described.

The above arrangement is particularly adaptable to further modification. The scanning body 13 can be shaped in any suitable manner, either as a rotation body or as a flat slide. The selector ribbon 140 can be dispensed with, if the selection of multiplier digits be effected by a horizontal movement of the screen frame 134. Mirrors 12 can be omitted, if a sufficiently long scanning body 13 be arranged in front of the screens 3¹. The size of the machine can be considerably reduced by shaping screens 3¹ as cylinders, similar to the screens 3 in the first described embodiment or by using flexible materials and winding them up like cinema films. The scanning body 13 could, if desired, be made in the same manner.

It will be readily understood that the slots on the multiplication screens may be arranged in any suitable manner. If the multiplicand is based on other than a decimal system, the primary products on the multiplication screens are worked out accordingly. Furthermore, if the machine according to this invention is to be used for certain standard calculations only, the slots on the multiplication screens may be arranged accordingly. For instance, if a standard rate of discount of 10% has to be deduced from each final product, the partial products may be suitably worked out; for instance, 8×5=36, i. e. 40 less 10%. In this manner the additional operation of discounting may be eliminated. The multiplication screens or ribbons may be made easily interchangeable so as to meet various requirements.

It is to be understood that the lamps 10, 343 and the light sensitive cell or cells 17 may be replaced by any suitable sources of radiant energy and devices sensitive to radiant energy respectively. Any kind of radiation capable of being screened off, and of producing variations in an electric circuit controlling an electromagnetic relay, can be used. The device sensitive to radiant energy is used in connection with the necessary amplifiers, rectifiers, resistances and other auxiliary devices, the uses of which are well known and therefore they have been only generally illustrated in the accompanying drawings (253, Figures 1, 4 and 5).

For amplification purposes an auxiliary relay or relays may be used, the arrangement being such that the device sensitive to radiant energy on being actuated operates the auxiliary relay, which controls the circuit of the main relay or relays of the transmission mechanism.

What I claim is:

1. In a light-controlled calculating machine, a plurality of precomputed products tables, one for each denomination of one factor entering into the calculation, each of said tables being divided into product areas corresponding to the digits of the respective denomination of the first factor and to the digits of the second factor, each product area being subdivided into two areas for the units and tens components of the respective partial product, means for selecting product areas corresponding to the desired digits of the first factor and of the second factor, means for illuminating selected product areas in all of said precomputed products tables, means for transmitting light from said selected product areas to a scanning line and forming on said scanning line light spots which indicate by their positions in said line the values of all components, arranged alternately as to units and tens, means for scanning said line of light spots, and means responsive to light transmitted by said scanning means for entering into a register values indicated by the said light spots.

2. In a light-controlled calculating machine, a plurality of precomputed products tables, one for each denomination of one factor entering into the calculation, each table being divided laterally and longitudinally into areas corresponding to the ten digits (0 to 9) to give 100 product areas, each product area being divided into two equal elemental areas for units and tens components respectively, and each elemental area having a mark in any one of ten positions (0 to 9) to indicate the value of the respective components, the transparency of said marks being different to that of the tables, means for simultaneously illuminating selected product areas in all of said precomputed products tables, means for transmitting light from said selected product areas to a scanning line and forming on said scanning line light spots which indicate by their positions in said line the values of all components arranged alternately as to units and tens, means for scanning said line of light spots, and means responsive to light transmitted by said scanning means for entering into a register values indicated by the said light spots.

3. In a light-controlled calculating machine, registering means comprising a plurality of clutches and registering elements driven thereby, each clutch being associated with a denomination of the result to be registered, means for driving a group of said clutches in denominational sequence, means for engaging each clutch of the group of clutches with, and disengaging it from, a registering element, means for shifting said clutch-driving means progressively into operative relation to different groups of clutches in its repeated operations to vary denominational entry, and means for restoring said clutch-driving means after a certain number of operations.

4. In a light-controlled calculating machine, a plurality of precomputed products tables, one for each denomination of one factor entering into the calculation, each product area being divided into two elemental areas for units and tens components respectively, means for simultaneously illuminating selected product areas in all of said precomputed products tables, means for transmitting light from said selected product areas to a scanning line and forming on said scanning line light spots which indicate by their positions the values of all components arranged alternately as to units and tens, means for scanning said line of light spots, and for transferring to a register the values of the said light spots, registering means comprising a plurality of clutches, one for each denomination of the result, means for driving said clutches successively in denominational sequence, means for engaging each of said clutches with, and disengaging it from, a registering element of the registering mechanism, means for shifting said clutch-driving means in order to drive groups of said clutches progressively in accordance with the varying denominational order of the calculated result, and means for restoring said clutch-driving means on completing a calculating operation.

5. In a light-controlled calculating machine registering means comprising a plurality of clutches, one for each denomination of the result, means for driving said clutches in groups, the said clutch-driving means acting to drive the first and last clutch of each group through a single revolution and all clutches intermediate the first and last clutches of each group through two revolutions, in order to transfer the units and tens of each partial product to the registering mechanism, the clutches of each group being driven successively in denominational sequence, means for engaging each of said clutches in a group with, and disengaging it from, a registering element of the registering mechanism, means for shifting said clutch-driving means in order to drive the various groups of clutches progressively in accordance with the varying denominational order of the calculated result, and means for restoring said clutch-driving means on completing a calculating operation.

6. In a light-controlled calculating machine, a plurality of precomputed products tables, one for each denomination of one factor entering into the calculation, each product area being divided into two elemental areas for units and tens components respectively, means for selectively setting said tables in accordance with the denominational values of this factor, means for selectively pre-setting the values of the second factor, automatic means for consecutively setting said tables in accordance with the progressive denominations of the pre-set second factor, means for illuminating selected product areas in all of said precomputed products tables, means for transmitting light from said selected product areas to a scanning line and forming on said scanning line light spots which indicate by their positions the values of all components arranged alternately as to units and tens, means for scanning said line of light spots, and means for transferring to a register values indicated by the said light spots.

7. In a light-controlled calculating machine, a plurality of rotatably mounted, axially slidable cylindrical precomputed products tables, one for each denomination of one factor entering into the calculation, each product area being divided into two elemental areas for units and tens components respectively, means for axially shifting said tables to set them respectively in accordance with the various denominational values of a multiplicand, means for pre-setting a multiplier, means for simultaneously rotating all of said tables to set them in accordance with the value of a denomination of a multiplier, said last mentioned means acting periodically to set the tables consecutively in accordance with the successive denominational values of the pre-set multiplier, means for illuminating the selected product areas in all of said precomputed products tables, means for transmitting light from said selected product areas to a scanning line and forming on said scanning line light spots which indicate by their positions the values of all components arranged alternately as to units and tens, means for scanning said line of light spots, and means for transferring to a register values indicated by the said light spots.

8. In a light-controlled calculating machine, a plurality of flat precomputed products tables, one for each denomination of one factor entering into the calculation, each product area being divided into two elemental areas for units and tens components respectively, means for moving said tables to set them respectively in accordance with the various denominational values of a multiplicand, means for pre-setting a multiplier, a selector mask, means for moving said selector mask across said tables in accordance with the value of a denomination of a multiplier in order to expose the corresponding product area on all of said precomputed products tables, said last mentioned means acting periodically to make consecutive adjustments of the mask in accordance with the succeeding denominational values of the pre-set multiplier, means for illuminating the selected product areas in all of said precomputed products tables, means for transmitting light from said selected product areas to a scanning line and forming on said scanning line light spots which indicate by their positions the values of all components arranged alternately as to units and tens, means for scanning said line of light spots, and means for transferring to a register values equivalent to the values of the said light spots.

9. In a light-controlled calculating machine, a plurality of precomputed products tables, impervious to light, one for each denomination of one factor entering into the calculation, each table being divided laterally and longitudinally into areas corresponding to the ten digits (0 to 9) to give 100 product areas, each product area being divided into two equal elemental areas for units and tens components respectively, and each elemental area having a light-transparent mark in any one of ten positions (0 to 9) to indicate the value of the respective component, means for selecting product areas, means for illuminating the selected product areas in all of said precomputed products tables, means for transmitting light from said selected product areas to a scanning line and forming on said scanning line light spots which indicate by their positions the values of all components, a rotary scanning member for scanning said line of light spots, registering means on which values indicated by the said light spots are registered, said registering means comprising a plurality of clutches, means for driving said clutches, in denominational sequence, means for engaging each of said clutches with, and disengaging it from, a registering element of the registering mechanism, means for shifting said clutch-driving means in order to drive groups of said clutches progressively in accordance with the varying denominational order of the calculated result, and means for restoring said clutch driving means on completing a calculating operation.

10. A light-controlled calculating machine according to claim 9, wherein the clutches are driven in groups and the means for driving the clutches drive the first and last clutch of each group through a single revolution and all clutches intermediate the first and last clutches of each group through two revolutions, in order to transfer the units and tens of each partial product to the registering mechanism.

11. A light-controlled calculating machine according to claim 9, further comprising means for driving the clutches in groups, the said means driving the first and last clutch of each group through a single revolution and all clutches intermediate the first and last clutches of each group through two revolutions, a rotary scanning member in the form of a non-transparent drum furnished with transparent scanning marks arranged in sets of twenty, ten marks each for the units component and the tens component of each partial product, a light-sensitive device positioned in the interior of said drum, and means for driving the said scanning drum in timed relation to the said clutch-driving means, the scanning marks being arranged to pass across the scanning line in succession alternately as to units and tens, and means controlled by the light-sensitive device for operating the clutches.

12. A light-controlled calculating machine according to claim 9, wherein the clutch-driving means comprises for each clutch a driving element having a cam-like member adapted to render the clutch operative prior to each revolution of said clutch.

13. A light-controlled calculating machine according to claim 9, wherein the means for selecting product areas comprise manually operated setting means for shifting said products tables in one direction to select groups of product areas according to the multiplicand denominations, manually operated means for selectively pre-setting the multiplier, and automatically operated means for shifting all said products tables in another direction to select one product area from each of said groups of product areas in accordance with the pre-set multiplier denominations, said automatic means acting periodically to select product areas consecutively in accordance with progressive multiplier denominations, and means for driving said automatic means alternately with said clutch-driving means.

14. A light-controlled calculating machine according to claim 9, wherein the precomputed products tables are rotatable and axially slidable, and the means for selecting product areas on the said products tables comprise means for axially shifting said tables to set them respectively in accordance with the denominations of the multiplicand, means for pre-setting the multiplier, and automatic means acting periodically to rotate all of said tables to set them in accordance with the progressive denominations of the pre-set multiplier.

DANIEL BROIDO.